US012434701B2

(12) United States Patent
Watanabe et al.

(10) Patent No.: US 12,434,701 B2
(45) Date of Patent: Oct. 7, 2025

(54) VEHICLE TRAVEL CONTROL APPARATUS

(71) Applicant: SUBARU CORPORATION, Tokyo (JP)

(72) Inventors: Akihiro Watanabe, Tokyo (JP); Shinya Katakai, Tokyo (JP); Atsushi Imai, Tokyo (JP); Kazumasa Fukuchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 254 days.

(21) Appl. No.: 17/491,808

(22) Filed: Oct. 1, 2021

(65) Prior Publication Data
US 2022/0105936 A1 Apr. 7, 2022

(30) Foreign Application Priority Data

Oct. 2, 2020 (JP) .................. 2020-168087

(51) Int. Cl.
B60W 30/165 (2020.01)
B60W 10/06 (2006.01)
B60W 10/18 (2012.01)
B60W 10/20 (2006.01)
G06V 20/56 (2022.01)
G06V 20/58 (2022.01)

(52) U.S. Cl.
CPC .......... B60W 30/165 (2013.01); B60W 10/06 (2013.01); B60W 10/18 (2013.01);
(Continued)

(58) Field of Classification Search
CPC ...... B60W 10/06; B60W 10/18; B60W 10/20; B60W 2552/10; B60W 2552/53;
(Continued)

(56) References Cited

U.S. PATENT DOCUMENTS 11,685,405 B2 * 6/2023 Hashimoto ............. G06F 18/24
701/301
11,900,690 B2 * 2/2024 Hashimoto ............... G06T 7/73
(Continued)

FOREIGN PATENT DOCUMENTS

DE 102008011228 A1 * 8/2009 ............ B60W 30/16
JP H09-272414 A 10/1997
(Continued)

OTHER PUBLICATIONS

Machine translation of DE-102008011228-A1 (Year: 2025).*
(Continued)

Primary Examiner — Aniss Chad
Assistant Examiner — Jennifer M Anda
(74) Attorney, Agent, or Firm — TROUTMAN PEPPER LOCKE LLP

(57) ABSTRACT

A vehicle travel control apparatus includes an outside recognition device, a traveling environment recognition section, a steering control unit, and an engine control unit. The outside recognition device acquires traveling-environment image data that is image data of a traveling environment in front of an own vehicle that is applied with the apparatus. The traveling environment recognition section performs, on the basis of the traveling-environment image data, a detection of lane lines each provided between lanes, lighting of a brake lamp of another vehicle, and blinking of a turn signal lamp of the other vehicle. The steering control unit operates a driving source of a steering mechanism provided in the own vehicle. The engine control unit controls the own vehicle to travel along a target traveling course, by controlling the steering control unit on the basis of a result of the detection performed by the traveling environment recognition section.

9 Claims, 23 Drawing Sheets

(52) U.S. Cl.
CPC ........... *B60W 10/20* (2013.01); *G06V 20/584* (2022.01); *G06V 20/588* (2022.01); *B60W 2552/10* (2020.02); *B60W 2552/53* (2020.02); *B60W 2554/4041* (2020.02); *B60W 2554/4045* (2020.02); *B60W 2710/06* (2013.01); *B60W 2710/18* (2013.01); *B60W 2710/20* (2013.01); *B60W 2720/106* (2013.01)

(58) Field of Classification Search
CPC . B60W 2554/4041; B60W 2554/4045; B60W 2710/06; B60W 2710/18; B60W 2710/20; B60W 2720/10; B60W 2720/106; B60W 2754/30; B60W 30/16; B60W 30/165; G06V 20/584; G06V 20/588
See application file for complete search history.

(56) References Cited

U.S. PATENT DOCUMENTS

| | | | | |
|---|---|---|---|---|
| 2011/0010094 | A1* | 1/2011 | Simon | G08G 1/167 701/301 |
| 2013/0226402 | A1* | 8/2013 | Tsuruta | B60W 30/16 701/36 |
| 2013/0226433 | A1 | 8/2013 | Tominaga et al. | |
| 2014/0005907 | A1 | 1/2014 | Bajpai | |
| 2015/0197249 | A1* | 7/2015 | Sakima | B60W 30/16 701/96 |
| 2017/0225686 | A1* | 8/2017 | Takaso | G05D 1/0219 |
| 2018/0068191 | A1* | 3/2018 | Biemer | G06T 7/70 |
| 2018/0281793 | A1 | 10/2018 | Terayama et al. | |
| 2019/0061758 | A1 | 2/2019 | Ide | |
| 2019/0092318 | A1* | 3/2019 | Mei | G06N 3/04 |
| 2020/0130690 | A1* | 4/2020 | Chow | B60W 30/0956 |
| 2020/0231152 | A1 | 7/2020 | Ide | |

FOREIGN PATENT DOCUMENTS

| | | |
|---|---|---|
| JP | 2013-177054 A | 9/2013 |
| JP | 2018-171959 A | 11/2018 |
| JP | 2019-038314 A | 3/2019 |

OTHER PUBLICATIONS

Japanese Office Action issued in corresponding JP Application No. 2020-168087, dated May 28, 2024, related to U.S. Appl. No. 17/491,808.

* cited by examiner

VEHICLE TRAVEL CONTROL APPARATUS

CROSS-REFERENCE TO RELATED APPLICATION

The present application claims priority from Japanese Patent Application No. 2020-168087 filed on Oct. 2, 2020, the entire contents of which are hereby incorporated by reference.

BACKGROUND

The technology relates to a vehicle travel control apparatus that causes an own vehicle to follow a preceding vehicle and to travel along a target traveling course.

Regarding vehicle driving assistance, adaptive cruise control has been known that causes an own vehicle to detect a preceding vehicle on a target traveling course set in front of the own vehicle, and, in a case where an inter-vehicular distance between the own vehicle and the preceding vehicle is within a set inter-vehicular distance, causes the own vehicle to travel along the target traveling course while maintaining a predetermined inter-vehicular distance.

In such a driving assistance technique, various types of traveling control are performed in the following manner. In other words, first, the target traveling course is set in such a manner that the own vehicle travels, for example, along the middle of a traveling lane, between lane lines that define left and right sides of the traveling lane. Thereafter, various types of traveling control such as adaptive cruise control and lane keeping control are performed to cause the own vehicle to travel along the target traveling course. The traveling control is performed on the basis of data of a traveling environment in front of the own vehicle acquired by a traveling environment data acquisition unit including a camera or a radar mounted on the own vehicle, or a combination thereof, and map data and vehicle position data included in a car navigation system.

For example, Japanese Unexamined Patent Application Publication No. 2018-171959 discloses a vehicle travel control apparatus that is able to detect an obstacle avoiding action of a preceding vehicle at an early stage and to perform an obstacle avoiding action of an own vehicle well in advance.

SUMMARY

An aspect of the technology provides a vehicle travel control apparatus including an outside recognition device, a traveling environment recognition section, a steering control unit, and an engine control unit. The outside recognition device is configured to acquire traveling-environment image data that is image data of a traveling environment in front of an own vehicle that is a vehicle to be applied with the vehicle travel control apparatus. The traveling environment recognition section is configured to perform, on the basis of the traveling-environment image data acquired by the outside recognition device, a detection of lane lines each provided between lanes, a detection of lighting of a brake lamp of another vehicle that is different from the own vehicle, and a detection of blinking of a turn signal lamp of the other vehicle. The steering control unit is configured to operate a driving source of a steering mechanism provided in the own vehicle. The engine control unit is configured to control the own vehicle to travel along a target traveling course, by controlling the steering control unit on the basis of a result of the detections performed by the traveling environment recognition section. After a predetermined time period elapses from a time point at which the blinking of the turn signal lamp is completed and is turned off in the other vehicle in which the blinking of the turn signal lamp has been detected, the traveling environment recognition section is configured to turn into a state in which a process of detecting the blinking of the turn signal lamp in the other vehicle is executable again.

An aspect of the technology provides a vehicle travel control apparatus including an outside recognition device and circuitry. The outside recognition device is configured to acquire traveling-environment image data that is image data of a traveling environment in front of an own vehicle that is a vehicle to be applied with the vehicle travel control apparatus. The circuitry is configured to: perform, on the basis of the traveling-environment image data acquired by the outside recognition device, a detection of lane lines each provided between lanes, a detection of lighting of a brake lamp of another vehicle that is different from the own vehicle, and a detection of blinking of a turn signal lamp of the other vehicle; operate a driving source of a steering mechanism provided in the own vehicle; control the own vehicle to travel along a target traveling course, by controlling the operation of the driving source of the steering mechanism on the basis of a result of the detections performed by the circuitry; and be ready to, after a predetermined time period elapses from a time point at which the blinking of the turn signal lamp is completed and is turned off in the other vehicle in which the blinking of the turn signal lamp has been detected, execute again a process of the detection of the blinking of the turn signal lamp in the other vehicle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

FIG. 19 is a diagram illustrating a state in which a preceding vehicle is switched to the right parallel-traveling vehicle that has cut in.

DETAILED DESCRIPTION

While performing driving assistance such as adaptive cruise control or lane keeping control, there are, for example: a case where reliability of lane line recognition is low; and a case where a lane line is unrecognizable and traveling control is performed by following a preceding vehicle. In such cases, steering control can be performed in such a manner that a steering wheel of an own vehicle follows a behavior of the preceding vehicle which deviates from a desired traveling course.

It is desirable to provide a vehicle travel control apparatus that is able to suppress, when executing driving assistance, steering control in which a steering wheel of an own vehicle follows a behavior of a preceding vehicle.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. The accompanying drawings relates to example embodiments of the technology, and FIG. 1 is a diagram illustrating an overall configuration of a travel control system.

Figure 1:
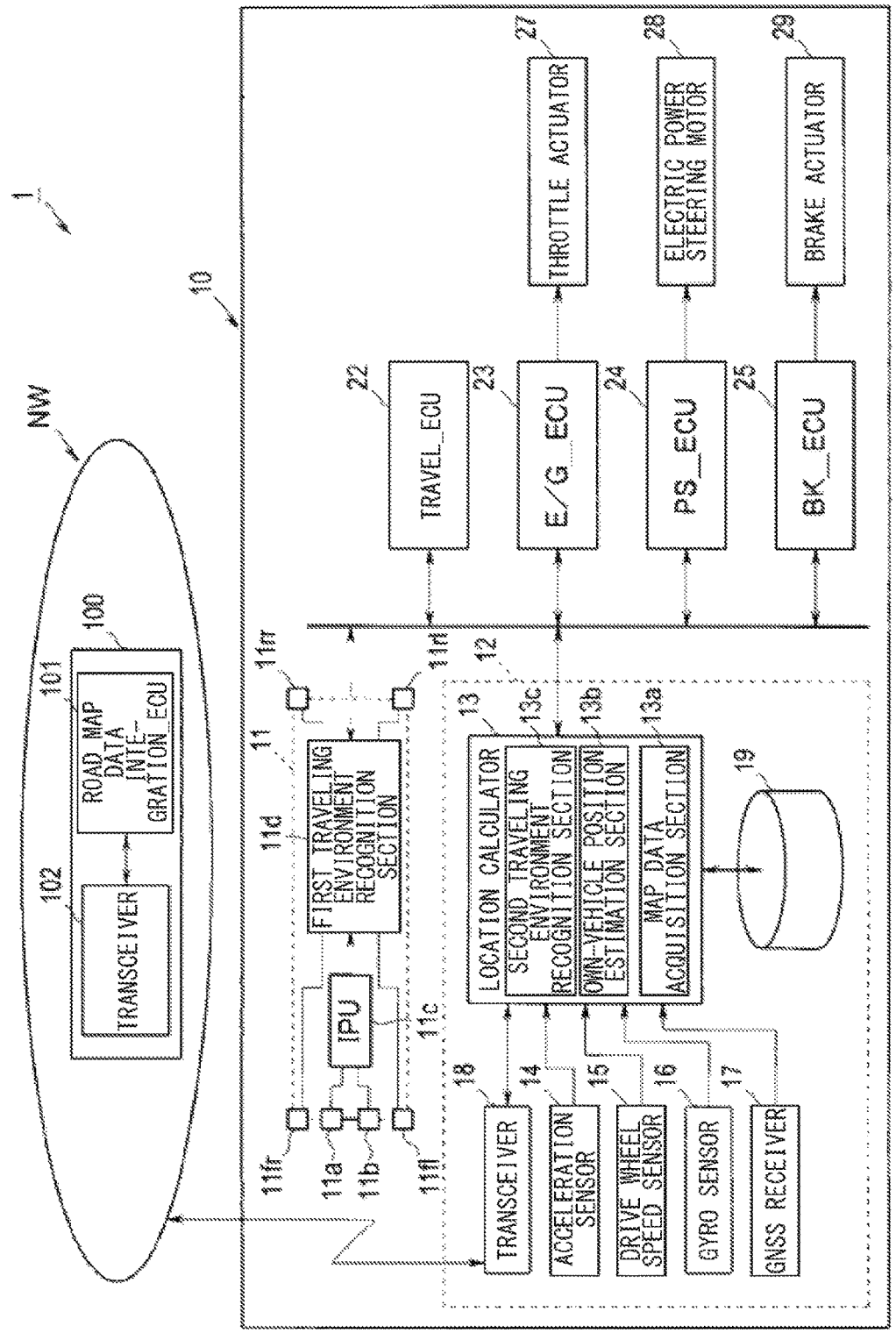
FIG. 1 is a diagram illustrating an overall configuration of a travel control system of a vehicle according to one example embodiment of the technology.
Figure 2:
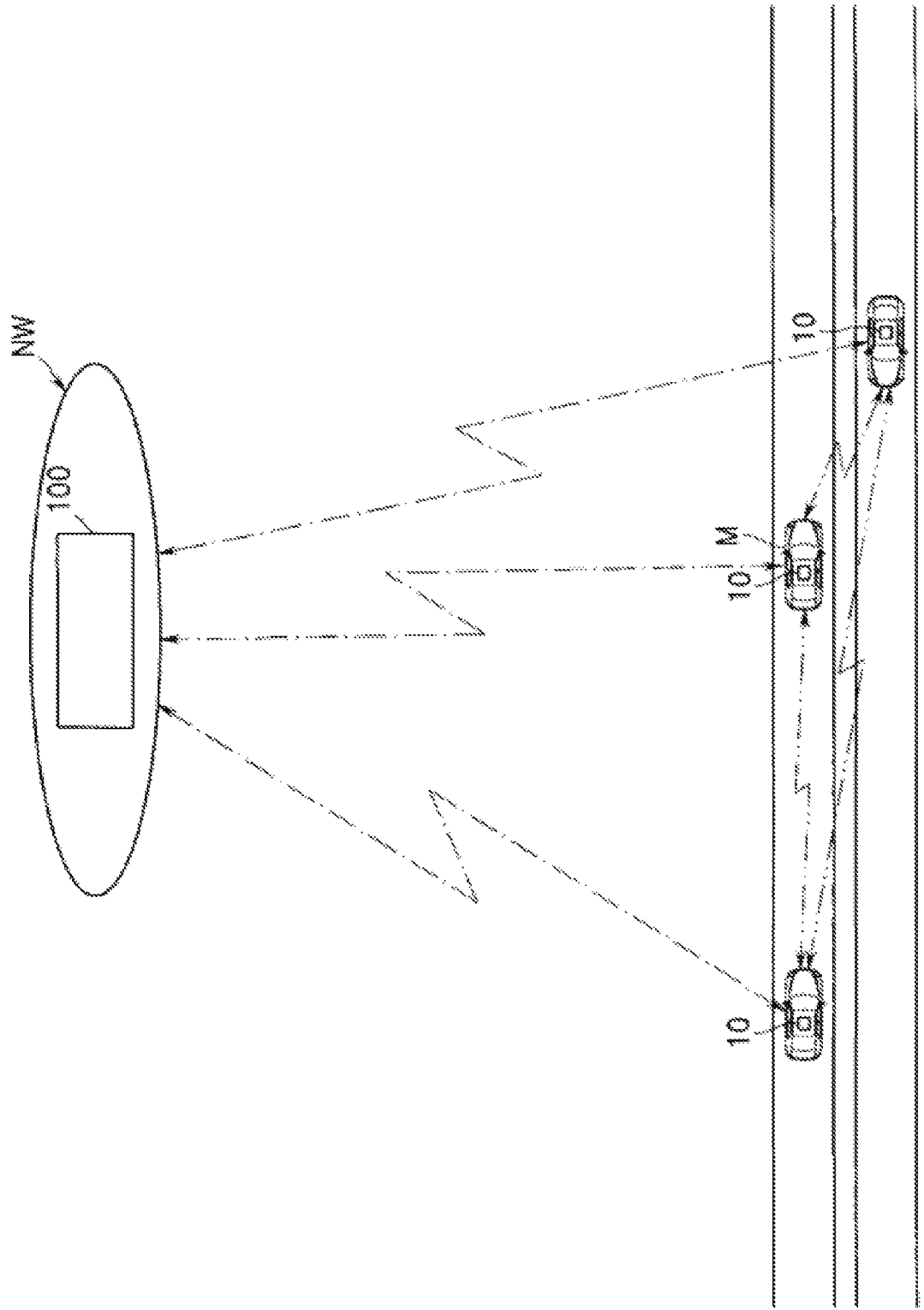
FIG. 2 is an explanatory diagram illustrating a road-to-vehicle communication and an inter-vehicle communication.

As illustrated in FIGS. 1 and 2, a travel control system 1 according to the example embodiment may include: travel control apparatuses 10 mounted on a respective plurality of vehicles; and a plurality of traffic control apparatuses 100 provided in a network environment NW to which the plurality of travel control apparatuses 10 is coupled via radio communication. The traffic control apparatus 100 may be provided, for example, as a server apparatus of a network environment using cloud computing or edge computing, or of a network environment using a road ancillary facility network.

The traffic control apparatus 100 may sequentially integrate and update pieces of road map data transmitted from the respective vehicle travel control apparatuses 10 and may transmit the updated road map data to each vehicle. For this purpose, the traffic control apparatus 100 may include a road map data integration_ECU 101 and a transceiver 102.

The road map data integration_ECU 101 may integrate pieces of road map data collected, through the transceiver 102, from the plurality of vehicles, and may sequentially update the road map data around the vehicles on the road. The road map data may include, for example, a dynamic map, and has four layers of data, i.e., static data and quasi-static data each mainly including road data, and quasi-dynamic data and dynamic data each mainly including traffic data.

The static data may include, for example, data to be updated within one month or less, such as roads, structures on roads, lane data, road surface data, or permanent regulation data. The quasi-static may data include, for example, data to be updated within one hour, such as traffic regulation data due to road construction, an event, etc., wide area weather data, or traffic congestion prediction.

The quasi-dynamic data may include, for example, data to be updated within one minute, such as: temporal traveling-disturbance conditions including an actual congestion condition and a traveling regulation at the time of observation, a fallen object, and an obstacle; an actual accident state; or narrow area weather data.

The dynamic data may include, for example, data to be updated within one second, such as data transmitted and exchanged between mobile objects, data of a traffic light currently being indicated, data of a pedestrian or a two-wheeled vehicle in an intersection, or data of a vehicle traveling straight across an intersection.

Such road map data may be maintained and updated at intervals until next data is received from each vehicle, and the updated road map data may be transmitted to each vehicle through the transceiver 102 as appropriate.

The vehicle travel control apparatus 10 may include, as units that recognize an external traveling environment, a traveling environment recognition unit 11 and a locator unit 12. The travel control apparatus 10 may further include a travel control unit (hereinafter referred to as "travel_ECU") 22, an engine control unit (hereinafter referred to as "E/G_ECU") 23, a power steering control unit (hereinafter referred to as "PS_ECU") 24, and a brake control unit (hereinafter referred to as "BK_ECU") 25. In one embodiment, the E/G_ECU 23 may serve as an "engine control unit". In one embodiment, the PS_ECU 24 may serve as a "steering control unit". These control units 22 to 25, the traveling environment recognition unit 11, and the locator unit 12 may be coupled to each other via an in-vehicle communication line, which may be a controller area network (CAN), for example.

The traveling environment recognition unit 11 may be, for example, fixed to an upper middle of a front part inside a vehicle compartment. The traveling environment recognition unit 11 may include: an in-vehicle camera i.e., a stereo camera, including a main camera 11a and a sub-camera 11b; an image processing unit (IPU) 11c; and a first traveling environment recognition section 11d. In one embodiment, the in-vehicle camera may serve as an "outside recognition device". In one embodiment, the first traveling environment recognition section 11d may serve as a "traveling environment recognition section".

Figure 3:
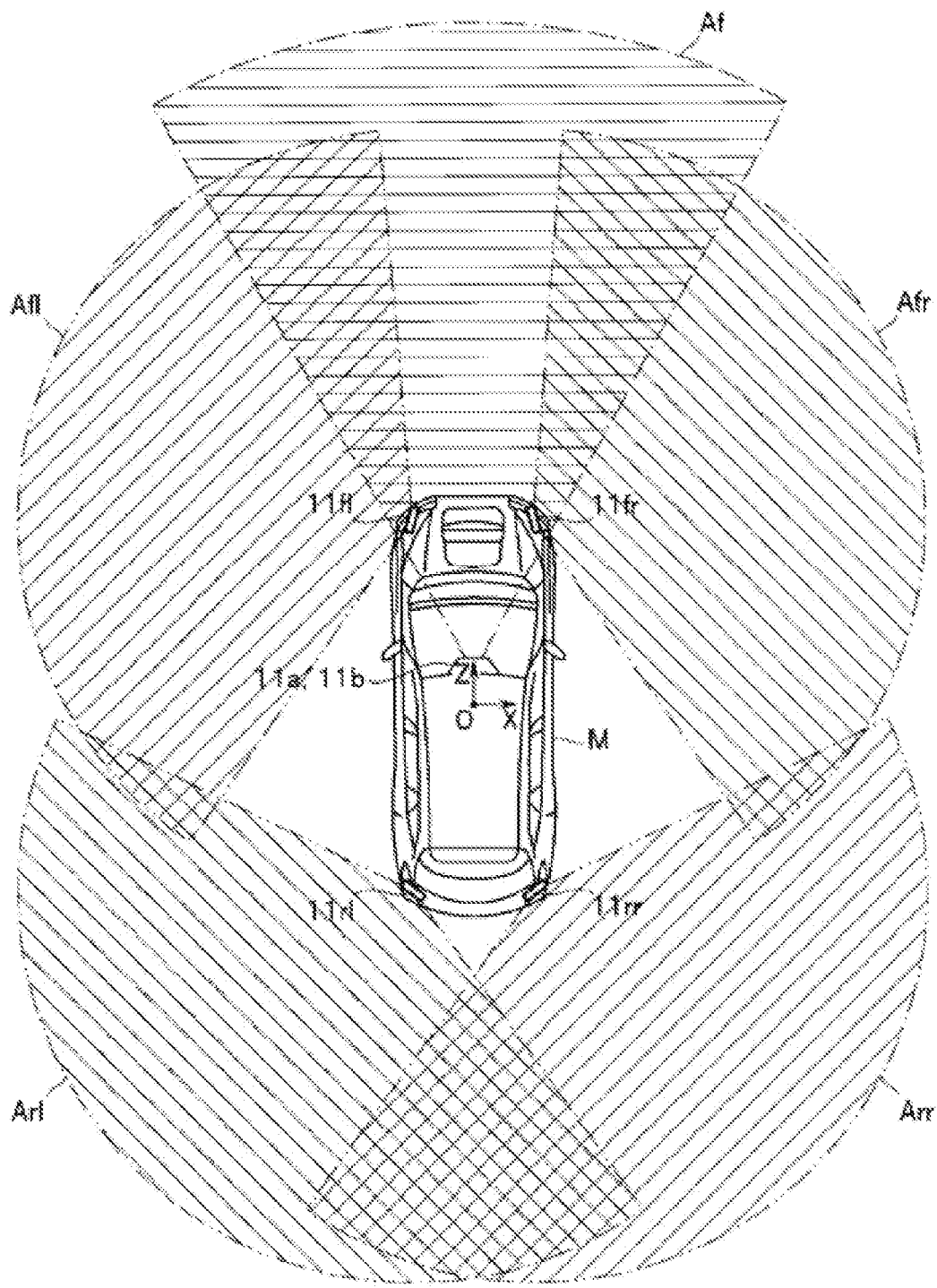
FIG. 3 is an explanatory diagram illustrating regions detected by a stereo camera and radar devices.

The main camera 11a and the sub-camera 11b may each be, for example, an autonomous sensor that senses a real space in front of an own vehicle M. The main camera 11a and the sub-camera 11b may be disposed, for example, at respective positions symmetrical in the left-right direction about the middle in a vehicle width direction, and may stereoscopically image a front region Af of the own vehicle M (see FIG. 3) from different viewpoints.

The IPU 11c may perform predetermined image processing on front-traveling-environment image data which is data of the space in front of the own vehicle M imaged by the main camera 11a and the sub-camera 11b, and may generate front-traveling-environment image data, i.e., distance image data, including distance data determined on the basis of a shift amount of a position of a corresponding object.

The first traveling environment recognition section 11d may determine a lane line that defines roads around the own vehicle M on the basis of, for example, the distance image data received from the IPU 11c.

The first traveling environment recognition section 11d may determine a road curvature [1/m] of lane lines that define the left and the right of the course along which the own vehicle travels, i.e., an own-vehicle traveling lane, and a width between the left and the right lane lines, i.e., a lane width.

Various methods of determining the road curvature and the lane width are known. For example, the first traveling environment recognition section 11d may recognize the left and right lane lines by performing a binarization process on the road curvature using luminance difference on the basis of the front-traveling-environment image data, and may determine the curvature of the left and right lane lines for each predetermined interval using, for example, a curve approximation formula obtained by the least squares method.

In addition, the first traveling environment recognition section 11d may perform, for example, predetermined pattern matching on the distance image data, and may recognize a three-dimensional object. Non-limiting examples of the three-dimensional object may include: a guard rail and a curbstone that are present along the road; or a pedestrian, a two-wheeled vehicle, and a vehicle other than the two-wheeled vehicle that are present on the road around the own vehicle M.

The recognition of the three-dimensional object performed by the first traveling environment recognition section 11d may include recognition of, for example, a type of the three-dimensional object, a distance to the three-dimensional object, a speed of the three-dimensional object, and a relative speed of the three-dimensional object to the own vehicle M. The three-dimensional object recognized on the basis of images captured by the in-vehicle camera in this manner is referred to as a camera object (camera OBJ).

To the first traveling environment recognition section 11d, a plurality of radar devices may be coupled as autonomous sensors. The plurality of radar devices may include a front-left-side radar device 11fl, a front-right-side radar device 11fr, a rear-left-side radar device 11rl, and a rear-right-side radar device 11rr.

The front-left-side radar device 11fl and the front-right-side radar device 11fr may be provided on the left and right sides, respectively, of a front bumper, for example. The front-left-side radar device 11fl and the front-right-side radar device 11fr may monitor regions Afl and Afr (see FIG. 3) diagonally forward and sideways on the left and the right of the own vehicle M that are unmonitorable in the image captured by the main camera 11a and sub-camera 11b described above. The front-left-side radar device 11fl and the front-right-side radar device 11fr may be disposed in such a manner that a portion of each of the regions Afl and Afr overlaps the front region Af to be imaged by the main camera 11a and sub-camera 11b.

The rear-left-side radar device 11rl and the rear-right-side radar device 11rr may be provided on the left and right sides, respectively, of a rear bumper, for example. The rear-left-side radar device 11rl and the rear-right-side radar device 11rr may monitor regions Arl and Arr (see FIG. 3) from the left and right sides to the rear of the own vehicle M that are unmonitorable by the front-left-side radar device 11fl and the front-right-side radar device 11fr described above.

The rear-left-side radar device 11rl and the rear-right-side radar device 11rr may be disposed in such a manner that portions of the respective regions Arl and Arr overlap each other, and overlap the regions Afl and Afr, respectively.

The radar devices 11fl, 11fr, 11rl, and 11rr may each include, for example, a millimeter-wave radar, a laser radar, and a light detection and ranging (LiDAR). Each of the radar devices 11fl, 11fr, 11rl, and 11rr may detect a plurality of reflection points on a three-dimensional object that is present around the own vehicle M by receiving a reflected wave of a radar wave such as a radio wave or a laser beam outputted horizontally.

The radar devices 11fl, 11fr, 11rl, and 11rr may analyze relative positions and traveling speeds of the plurality of detected reflection points and perform grouping, thereby recognizing a three-dimensional object. Further, each of the radar devices 11fl, 11fr, 11rl, and 11rr may set a reflection point having the closest linear distance to the own vehicle M among the reflection points on the recognized three-dimensional object as a representative point of the three-dimensional object. The three-dimensional object recognized by each of the radar devices 11fl, 11fr, 11rl, and 11rr is referred to as a radar object (radar OBJ).

Data such as a representative point Pr related to the radar OBJ recognized by each of the radar devices 11fl, 11fr, 11rl, and 11rr as described above may be inputted to the first traveling environment recognition section 11d. As a result, the first traveling environment recognition section 11d may be able to recognize not only a preceding vehicle that is in front of the own vehicle M, but also, for example: a parallel-traveling vehicle, which is present on a side of the own vehicle M; an intersecting vehicle approaching the own vehicle M at an intersection or the like from a direction which intersects an own-vehicle traveling course; and a subsequent vehicle that is present behind the own vehicle M.

The first traveling environment recognition section 11d may convert the positions of the recognized camera OBJ and the recognized radar OBJ into coordinates of a Cartesian coordinate system in which the center of the own vehicle M is represented by an origin O, for example. The Cartesian coordinate system is (a coordinate system in which a longitudinal direction of the own vehicle M is represented by a Z-axis and a width direction of the own vehicle M is represented by an X-axis.

Further, the first traveling environment recognition section 11d may compare the camera OBJ with the radar OBJ, and may recognize a combination of the camera OBJ and the radar OBJ that matches with each other on the basis of a preset condition as a fusion object (fusion OBJ), for example.

The locator unit 12 may estimate an own-vehicle position on a road map, and may include a location calculator 13 that estimates the own-vehicle position. Coupled to an input terminal of the location calculator 13 may be sensors that are desirable for estimating the position of the own vehicle M, i.e., the own-vehicle position. The sensors may include, for example: an acceleration sensor 14 that detects a longitudinal acceleration of the own vehicle M; a drive wheel speed sensor 15 that detects a rotating speed of each of the front, rear, left, and right wheels; a gyro sensor 16 that detects an angular velocity or an angular acceleration of the own vehicle; and a GNSS receiver 17 that receives positioning signals transmitted from a plurality of positioning satellites.

Further, a transceiver 18 may be coupled to the location calculator 13. The transceiver 18 may transmit and receive data to and from the traffic control apparatus 100 (road-to-vehicle communication: see one-dot dashed lines in FIG. 2), and may transmit and receive data between vehicles (inter-vehicle communication: see two-dot dashed lines in FIG. 2).

Still further, a high-precision road map database 19 may be coupled to the location calculator 13. The high-precision road map database 19 may be a large capacity storage medium such as a hard disk drive (HDD), and may store high-precision road map data (a dynamic map).

The high-precision road map data may have, as data that is desirable upon performing traveling control on the own vehicle M, data similar to the road map data that is sequentially updated by the road map data integration_ECU 101 described above, for example. In other words, the high-precision road map data may have four layers of data, i.e., the static data and the quasi-static data each mainly including road data, and the quasi-dynamic data and the dynamic data each mainly including traffic data.

The location calculator 13 may include a map data acquisition section 13a, an own-vehicle position estimation section 13b, and a second traveling environment recognition section 13c. The map data acquisition section 13a may acquire route map data from a current position to a destination from the map data stored in the high-precision road map database 19, on the basis of, for example, the destination set by a driver upon performing automated driving.

The map data acquisition section 13a may also transmit the acquired route map data (lane data on the route map) to the own-vehicle position estimation section 13b. The own-vehicle position estimation section 13b may acquire position coordinates of the own vehicle M on the basis of the positioning signals received by the GNSS receiver 17.

Further, the own-vehicle position estimation section 13b may perform map matching of the acquired position coordinates on the route map data, estimate an own-vehicle position on the road map, recognize left and right lane lines that define the own-vehicle traveling course (traveling lane), and acquire a road curvature of the middle of the traveling lane stored in the road map data.

In an environment where it is not possible to receive valid positioning signals from the positioning satellites due to a decrease in the sensitivity of the GNSS receiver 17, such as when driving in a tunnel, the own-vehicle position estimation section 13b may change a method of estimating the own-vehicle position on the road map to autonomous navigation. The own-vehicle position estimation section 13b in the autonomous navigation mode may estimate the own-vehicle position on the basis of: the vehicle speed determined on the basis of the drive wheel speed detected by the drive wheel speed sensor 15; the angular velocity detected by the gyro sensor 16; and the longitudinal acceleration detected by the acceleration sensor 14.

Further, the own-vehicle position estimation section 13b may estimate the own-vehicle position on the road map on the basis of the positioning signals received by the GNSS receiver 17 or the data detected by, for example, the gyro sensor 16 as described above. Thereafter, the own-vehicle position estimation section 13b may determine, for example, a road type of the road on which the own vehicle M is traveling on the basis of the estimated own-vehicle position on the road map.

The second traveling environment recognition section 13c may update the road map data stored in the high-precision road map database 19 to the latest state by using road map data acquired by external communication (the road-to-vehicle communication and the inter-vehicle communication) through the transceiver 18. Such data updating may be performed not only on the static data, but also on the quasi-static data, the quasi-dynamic data, and the dynamic data.

As a result, the road map data may include the road data and the traffic data acquired by communication with the outside of the vehicle, and data of a mobile object such as a vehicle traveling on a road may be updated on a substantially real-time basis.

The second traveling environment recognition section 13c may also verify the road map data on the basis of the traveling environment data recognized by the traveling environment recognition unit 11, and may update the road map data stored in the high-precision road map database 19 to the latest state. Such data updating may be performed not only on the static data, but also on the quasi-static data, the quasi-dynamic data, and the dynamic data.

As a result, data of a moving object such as a vehicle traveling on a road recognized by the traveling environment recognition unit 11 may be updated on a real-time basis. Thereafter, the thus updated road map data may be transmitted to, for example, the traffic control apparatus 100 and a vehicle around the own vehicle M via the road-to-vehicle communication and the inter-vehicle communication through the transceiver 18.

The second traveling environment recognition section 13c may recognize, as second traveling environment data, road map data of a set range centered on the own-vehicle position estimated by the own-vehicle position estimation section 13b, out of the updated road map data.

The range of the second traveling environment data recognized by the second traveling environment recognition section 13c may be wider than first traveling environment data recognized by the first traveling environment recognition section 11d. For example, road map data in a range having a radius of one kilometer centered on the own-vehicle position may be recognized as the second traveling environment data.

The first traveling environment data recognized by the first traveling environment recognition section 11d of the traveling environment recognition unit 11 and the second traveling environment data recognized by the second traveling environment recognition section 13c of the locator unit 12 may be read by the travel_ECU 22.

Coupled to an input terminal of the travel_ECU 22 may be various switches and sensors which are not illustrated, such as: a mode switching switch for the driver to turn on or off automated driving (travel control); a steering torque sensor that detects a steering torque as an amount of driving operation performed by the driver; a brake sensor that detects a brake-pedal pushing amount as the amount of driving operation performed by the driver; an accelerator sensor that detects an accelerator-pedal pushing amount as the amount of driving operation performed by the driver; and a yaw rate sensor that detects a yaw rate acting on the own vehicle M.

Set as driving modes in the travel_ECU 22 may be: a manual driving mode; a first travel control mode and a second travel control mode which are modes for traveling control; and a retraction mode. Those operation modes may be selectively switchable by the travel_ECU 22 on the basis of, for example, operation to the mode switching switch.

The manual driving mode may be a driving mode that necessitates steering to be performed by the driver, and is, for example, a driving mode that causes the own vehicle M to be driven according to driving operations such as a steering operation, an accelerator operation, and a brake operation to be performed by the driver.

The first travel control mode may also be a driving mode that necessitates the steering to be performed by the driver in a similar manner. In other words, the first travel control mode may be a semi-automated driving mode that causes the own vehicle M to travel along the target traveling course by appropriately combining mainly adaptive cruise control (ACC), active lane keep centering (ALKC) control, and active lane keep bouncing control, by controlling, for example, the E/G_ECU 23, the PS_ECU 24, and the BK_ECU 25, while reflecting the driving operation performed by the driver. The active lane keep centering control and the active lane keep bouncing control may each be an example of lane keep control.

The second travel control mode may be a mode that does not necessitate the steering, the accelerator operation, and the brake operation to be performed by the driver. The second travel control mode may be, for example, an automated driving mode that causes the own vehicle M to travel according to a target route (route map data) by appropriately combining mainly the adaptive cruise control, the active lane keep centering control, and the active lane keep bouncing control, by controlling, for example, the E/G_ECU 23, the PS_ECU 24, and the BK_ECU 25.

The retraction mode may be, for example, a mode for automatically stopping the own vehicle M in a side strip, etc., in a case where it is not possible to continue the driving operation in the second travel control mode and where the driver is unable to take over the driving operation (i.e., it is not possible to switch the mode to the manual driving mode or the first travel control mode), while the own vehicle M is traveling in the second travel control mode.

A throttle actuator 27 may be coupled to an output terminal of the E/G_ECU 23. The throttle actuator 27 may open and close a throttle valve of an electronically controlled throttle provided in a throttle body of an engine. In response to a drive signal from the E/G_ECU 23, the throttle valve may be opened and closed to regulate an intake air flow rate, thereby generating a desired engine output.

An electric power steering motor 28 serving as a driving source may be coupled to an output terminal of the PS_ECU 24. The electric power steering motor 28 may apply a steering torque to a steering mechanism by a rotational force of the motor. While performing automated driving, in response to a drive signal from the PS_ECU 24, the electric power steering motor 28 may be controlled to execute the active lane keep centering control that keeps the traveling along the current traveling lane and lane change control (lane change control for overtaking control, for example) that causes the own vehicle M to move to an adjacent lane.

A brake actuator 29 may be coupled to an output terminal of the BK_ECU 25. This brake actuator 29 may regulate a pressure of brake fluid to be fed to a brake wheel cylinder of each drive wheel. In response to a drive signal from the BK_ECU 25, the brake actuator 29 may be driven to cause the brake wheel cylinder to generate a brake force of a braking mechanism for each wheel. This forcibly decelerates the own vehicle M.

Image recognition of three-dimensional objects including other vehicles V1, V2, and V3 and lane lines LL and LR that define a traveling course along which the own vehicle M travels to be performed by the traveling environment recognition unit 11 will be described with reference to FIG. 4 by exemplifying a three-lane road.

Figure 4:
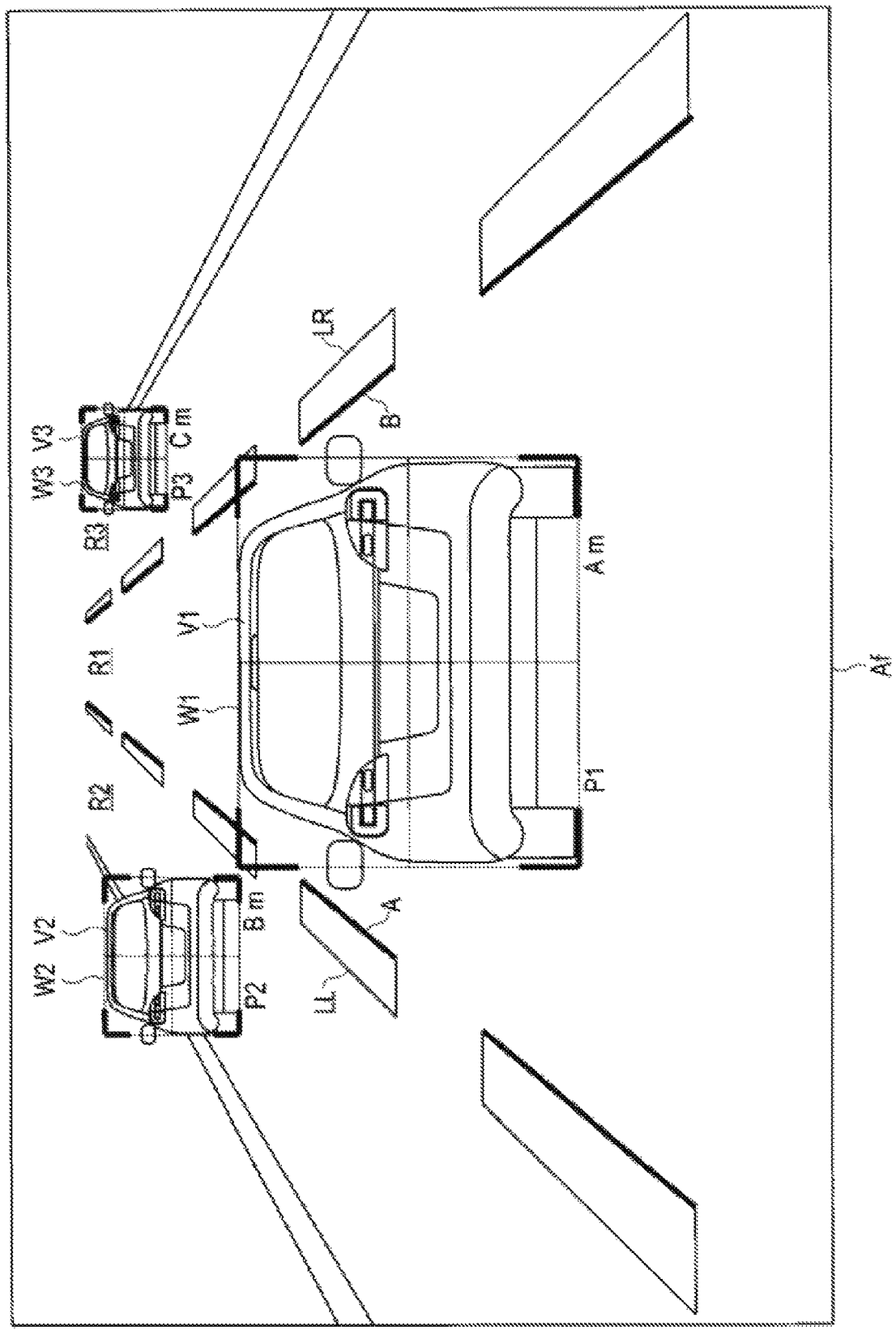
FIG. 4 is an explanatory diagram illustrating recognition of other vehicles and lane lines included in a detected front-region image.

As illustrated in FIG. 4, the first traveling environment recognition section 11d may detect the lane lines LL and LR that define the left and the right of a traveling lane R1 (own-vehicle traveling lane) as a traveling lane along which the own vehicle M travels. The detection may be performed on the basis of the front-traveling-environment image data to be generated by performing, by the IPU 11c, the predetermined image processing on the front region Af of the own vehicle M imaged by the main camera 11a and sub-camera 11b.

At this time, the first traveling environment recognition section 11d may recognize the left and right lane lines LL and LR on the basis of luminance change based on the traveling-environment image data of the front region Af. The lane lines LL and LR may be recognized by converting a plurality of candidate points extracted from the inner sides of the lane lines LL and LR into approximate lines A and B. It is to be noted that the first traveling environment recognition section 11d may similarly recognize lane lines of a left lane R2 and a right lane R3 as with the traveling lane R1.

Thus, the travel_ECU 22 may determine the target traveling course of the own vehicle M at the middle of the lane lines LL and LR, on the basis of the lane lines LL and LR of the traveling lane R1 that is the traveling lane recognized by the first traveling environment recognition section 11d. A steering target may be determined and the PS_ECU 24 may drive and control the electric power steering motor 28 along such a target traveling course, thereby executing, for example, the active lane keep centering control and the active lane keep bouncing control.

In addition, on the basis of the traveling-environment image data of the front region Af, the first traveling environment recognition section 11*d* may perform, for example, a perception process involving recognizing a first vehicle V1 traveling ahead along the traveling lane R1 as a preceding vehicle P1, recognizing a second vehicle V2 traveling along the left lane R2 as a left parallel-traveling vehicle P2, and recognizing a third vehicle V3 traveling along the right lane R3 as a right parallel-traveling vehicle P3. This may create models of frames (also referred to as bounding boxes or windows) W1, W2, and W3 for the respective vehicles V1, V2, and V3.

Attachment of a tag (class) indicating that a detected object is a vehicle and labeling (localization) of coordinate data with respect to the own vehicle M, for example, may be used to detect, for example, respective vehicle speeds of and respective inter-vehicular distances from the own vehicle M to the recognized preceding vehicle P1, left parallel-traveling vehicle P2, and right parallel-traveling vehicle P3.

In other words, the first traveling environment recognition section 11*d* may detect respective inter-vehicular distances Am, Bm, and Cm from the recognized frames W1, W2, and W3 to the own vehicle M. In addition, the first traveling environment recognition section 11*d* may detect respective vehicle speeds of the vehicles V1, V2, and V3 on the basis of relative speeds of the vehicles V1, V2, and V3 with respect to the speed of the own vehicle M.

At the time of following the preceding vehicle, following steering control may performed on the basis of a target point set at the middle of the frame W1 in which the preceding vehicle P1 (here, the first vehicle V1) is recognized, and vehicle speed control may be executed in accordance with a predetermined inter-vehicular distance with respect to the vehicle speed of the own vehicle M.

Some of recent tail lamps and turn signal lamps each use an LED light source in which control on a pulse width modulation (PWM) signal is performed. Accordingly, if the other vehicles V1, V2, and V3 that have been recognized each include, for example, a tail lamp or a brake lamp having the LED light source, the tail lamp or the brake lamp is detected as if the tail lamp or the brake lamp is blinking when driving assistance such as adaptive cruise control or lane keeping control is being executed. In this case, it is difficult to distinguish the lighting (blinking) of the tail lamps or the brake lamp from the lighting (blinking) of the turn signal lamp, and the blinking of the turn signal lamp is erroneously recognized.

In order to prevent erroneous recognition of the blinking of the turn signal lamp, control has been performed in such a manner that, after the blinking of the turn signal lamp of any of the vehicles V1, V2, and V3 has been recognized once and as long as the corresponding one of the vehicles V1, V2, and V3 does not deviate from the front-traveling-environment image data of the front region Af of the own vehicle M, a turn signal lamp recognition process to be performed on the corresponding one of the vehicles V1, V2, and V3 has been suppressed thereafter.

However, in a case where the vehicle V1 recognized as the preceding vehicle P1 leaves the traveling lane R1 along which the own vehicle M travels, or where the same vehicle V1 cuts into the traveling lane R1 along which the own vehicle M travels from another lane R2 or R3 again a plurality of times (see FIGS. 10 to 12 to be described later), the second and subsequent turn signal lamp recognition process to be performed on the vehicle V1 is not performed. Thus, steering control that follows a behavior of the vehicle V1 is performed. This has been a cause of great loss of steering control of the own vehicle M and deviation from the desired own-vehicle traveling course.

In order to improve such a phenomenon, the first traveling environment recognition section 11*d* may perform control to detect the lighting of the brake lamp and the blinking of the turn signal lamp of each of the vehicles V1, V2, and V3 a plurality of times for each of the vehicles V1, V2, and V3, as long as each of the vehicles V1, V2, and V3 does not deviate from the front-traveling-environment image data of the front region Af.

The turn signal lamp recognition process to be performed on the vehicle V1 which is recognized as the preceding vehicle P1 will be described by way of example. It is be noted that the plurality of times of turn signal lamp recognition process may also be performed on the vehicle V2 serving as the left parallel-traveling vehicle P2 and on the vehicle V3 serving as the right parallel-traveling vehicle P3, which travel in front of the own vehicle M. The vehicles V1, V2, and V3 are sometimes referred to as first vehicle V1, second vehicle V2, and third vehicle V3 in the following descriptions in order to distinguish them from each other.

Figure 5:
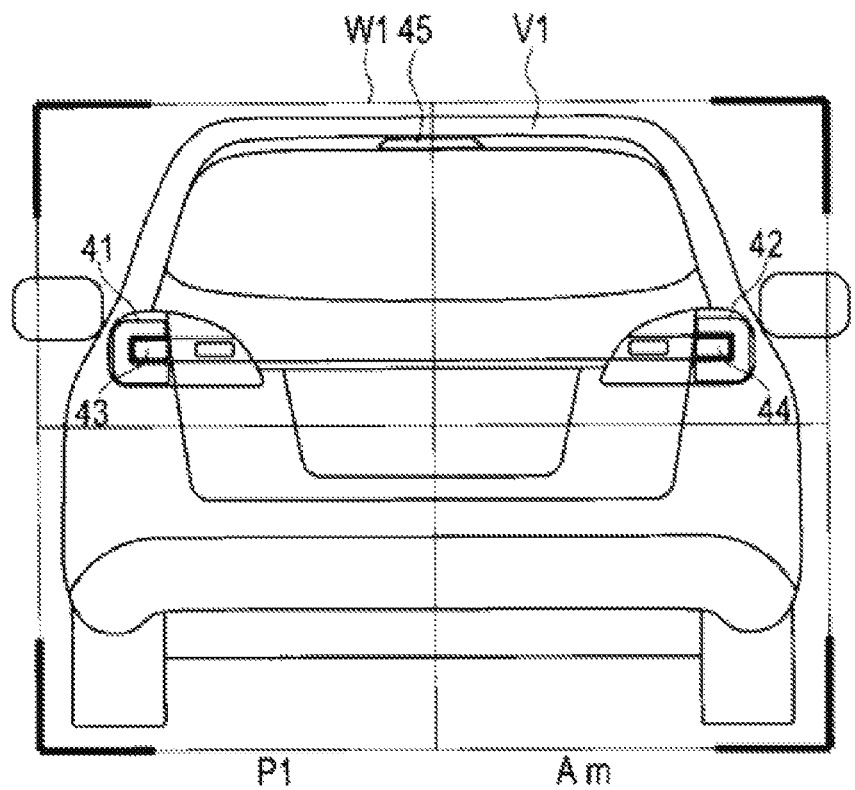
FIG. 5 is a diagram illustrating recognition of a preceding vehicle in a state in which tail lamps and brake lamps are unlit and turn signal lamps are not blinking.
Figure 6:
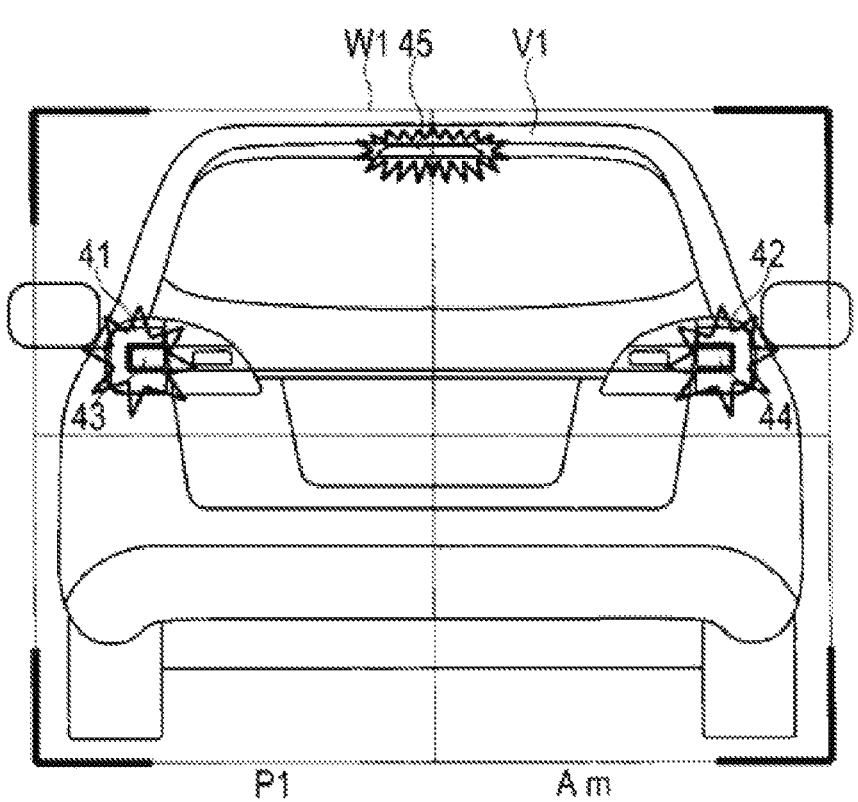
FIG. 6 is a diagram illustrating recognition of the preceding vehicle in a state in which the brake lamps are lit.

FIG. 5 illustrates a state in which brake lamps 41 and 42, a left turn signal lamp 43, and a right turn signal lamp 44 of the first vehicle V1 recognized as the preceding vehicle P1 are unlit. FIG. 6 illustrates a state in which the brake lamps 41 and 42 of the first vehicle V1 recognized as the preceding vehicle P1 are lit. In FIG. 6, a state is exemplified in which a high mounted stop lamp 45 of the first vehicle V1 recognized as the preceding vehicle P1 is lit.

Figure 7:
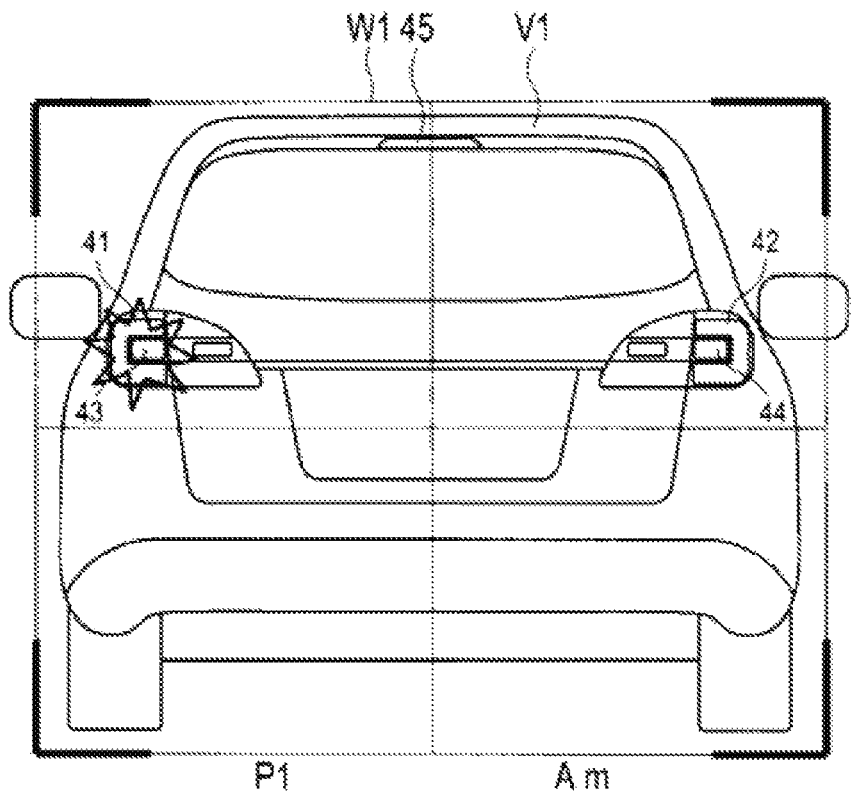
FIG. 7 is a diagram illustrating recognition of the preceding vehicle in a state in which a left turn signal lamp is lit.
Figure 8:
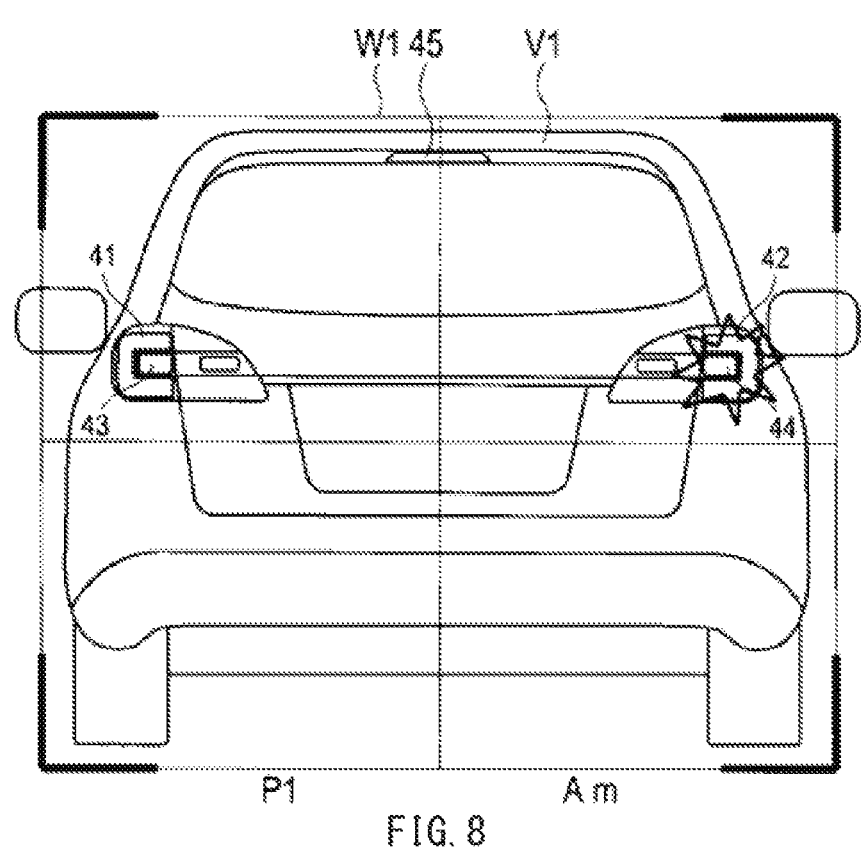
FIG. 8 is a diagram illustrating recognition of the preceding vehicle in a state in which a right turn signal lamp is lit.

FIG. 7 illustrates a state in which the left turn signal lamp 43 of the first vehicle V1 recognized as the preceding vehicle P1 is lit, and FIG. 8 illustrates a state in which the right turn signal lamp 44 of the first vehicle V1 recognized as the preceding vehicle P1 is lit.

The first traveling environment recognition section 11*d* may detect a lamp (light emission) having brightness of a predetermined luminance or greater, recognize lighting of the brake lamps 41 and 42, the left turn signal lamp 43, and the right turn signal lamp 44, and determine that lighting of a lamp having brightness less than a predetermined luminance is lighting of, for example, the tail lamps.

Such recognition of the brake lamps 41 the 42, the left turn signal lamp 43, and the right turn signal lamp 44 may be performed not only on the first vehicle V1 serving as the preceding vehicle P1, but also on the recognized second vehicle V2 serving as the left parallel-traveling vehicle P2 and on the recognized third vehicle V3 serving as the right parallel-traveling vehicle P3, which travel in front of the own vehicle M.

Figure 9:
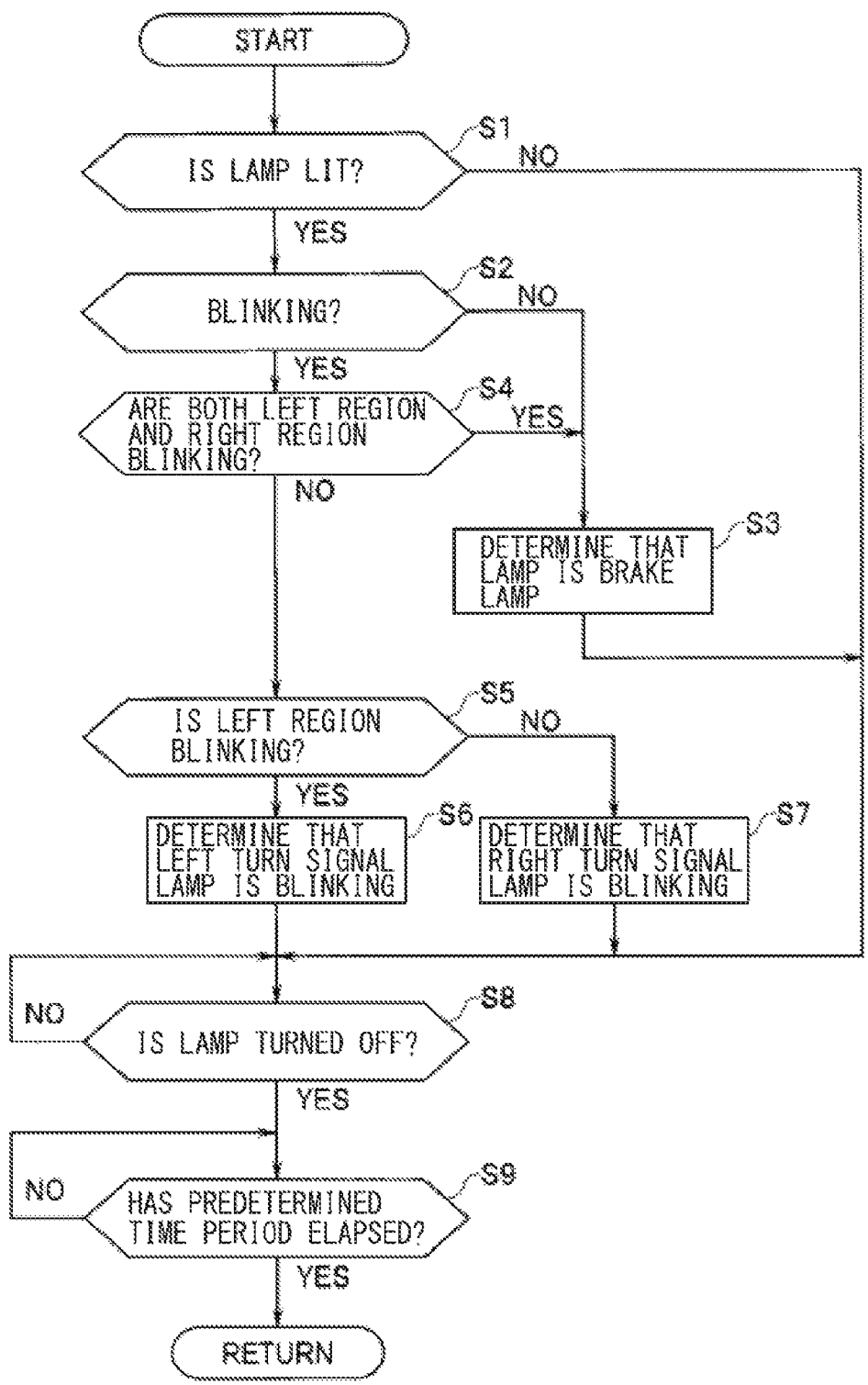
FIG. 9 is a flowchart illustrating a control example of determining lighting of the tail lamps and the brake lamps and blinking of the turn signal lamps.

Next, a control example to be performed when recognizing the lighting/blinking of the brake lamps 41 and 42, the left turn signal lamp 43, and the right turn signal lamp 44 of another vehicle traveling in front of the own vehicle M will be described with reference to a flowchart of FIG. 9. It is to be noted that the following exemplary control may be executed for the respective frames W1, W2, and W3 in which the first vehicle V1 serving as the preceding vehicle P1, the second vehicle V2 serving as the left parallel-traveling vehicle P2, and the third vehicle V3 serving as the right parallel-traveling vehicle P3, which travel in front of the own vehicle M, are recognized.

First, the first traveling environment recognition section 11*d* may determine whether the lamps in the frames W1, W2, and W3 in which the vehicles V1, V2, and V3 are recognized, respectively, are lit (S1). In step S1, lighting of any lamp may be detected by detecting the light on the basis of luminance change in each of the frames W1, W2, and W3.

The first traveling environment recognition section 11d may determine whether the light detected in step S1 is blinking (S2). If the first traveling environment recognition section 11d determines that the detected light is not blinking (S2: NO), the first traveling environment recognition section 11d may determine that the brake lamps 41 and 42 are lit (S3).

If the first traveling environment recognition section 11d determines that the detected light is blinking (S2: YES), the first traveling environment recognition section 11d may determine whether the light is blinking in both a predetermined left region and a predetermined right region inside each of the frames W1, W2, and W3 (S4). If the first traveling environment recognition section 11d determines that the light is blinking in both the predetermined left region and the predetermined right region inside each of the frames W1, W2, and W3 (S4: YES), the first traveling environment recognition section 11d may determine that the brake lamps 41 and 42 are lit (S3). As a result, it is possible to judge that the vehicles V1, V2, and V3 each use the LED light source for the brake lamps 41 and 42.

If the first traveling environment recognition section 11d determines that the light is not blinking in both the predetermined left region and the predetermined right region inside each of the frames W1, W2, and W3 (S4: NO), the first traveling environment recognition section 11d may determine whether the light is blinking in the predetermined left region inside each of the frames W1, W2, and W3 (S5).

If the light is blinking only in the predetermined left region inside each of the frames W1, W2, and W3 (S5: YES), the first traveling environment recognition section 11d may determine that the left turn signal lamp 43 of each of the vehicles V1, V2, and V3 is blinking (S6). As a result, the first traveling environment recognition section 11d may determine that the left turn signal lamp 43 of each of the vehicles V1, V2, and V3 is blinking.

If the light is not blinking only in the predetermined left region inside each of the frames W1, W2, and W3 (S5: NO), the first traveling environment recognition section 11d may determine that the right turn signal lamp 44 of each of the vehicles V1, V2, and V3 is blinking (S7). As a result, the first traveling environment recognition section 11d may determine that the right turn signal lamp 44 of each of the vehicles V1, V2, and V3 is blinking.

In step S5, the blinking of the detected light in the predetermined left region of each of the frames W1, W2, and W3 is determined; however, the blinking of the detected light in the predetermined right region of each of the frames W1, W2, and W3 may be determined. In this case, the control may be executed by reversely replacing the left and right of the control routine described above.

The first traveling environment recognition section 11d may determine whether the detected blinking of the left turn signal lamp 43 or the right turn signal lamp 44 is turned off (S8). If the first traveling environment recognition section 11d determines that the detected blinking of the left turn signal lamp 43 or the right turn signal lamp 44 has been turned off (S8: YES), the first traveling environment recognition section 11d may determine whether a predetermined time period has elapsed from the detection of the turning off of the turn signal lamp 43 or 44 of the corresponding one of the vehicles V1, V2, and V3 (S9).

For example, the first traveling environment recognition section 11d may determine whether the predetermined time period, such as at least five seconds, has elapsed from the detection of the previous turning off of the turn signal lamp 43 or the turn signal lamp 44 of each of the vehicles V1, V2, and V3. In other words, the first traveling environment recognition section 11d may determine whether the predetermined time period has elapsed from the turning off of the left turn signal lamp 43 or the right turn signal lamp 44, in which the blinking has been detected the previous time (last time), of the corresponding one of the vehicles V1, V2, and V3.

The first traveling environment recognition section 11d may cause the process to exit the routine and return to step S1 after the predetermined time period has elapsed from the detection of the previous turning off of the turn signal lamp 43 or 44 in the corresponding one of the vehicles V1, V2, and V3 (S9: YES).

In other words, the first traveling environment recognition section 11d does not cause the process to return to step S1 if the predetermined time period has not elapsed from the detection of the previous turning off of the turn signal lamp 43 or 44 of the corresponding one of the vehicles V1, V2, and V3 (S9: NO), and thus may perform control not to execute the process of detecting the blinking of the turn signal lamp 43 or 44. Accordingly, the first traveling environment recognition section 11d executes control to enable the process of detecting the blinking of the turn signal lamp 43 or 44 of the corresponding one of the vehicles V1, V2, and V3 only in a case where the predetermined time period has elapsed from the detection of the previous turning off of the turn signal lamp 43 or 44.

As described above, the travel control apparatus 10 of the travel control system 1 in the example embodiment may execute control in the following manner. The first traveling environment recognition section 11d may distinguish and recognize the lighting of the tail lamps and the left and right brake lamps 41 and 42 or the blinking of the left and right turn signal lamps 43 and 44 of each of the vehicles V1, V2, and V3. The first traveling environment recognition section 11d may cause the corresponding one of the vehicles V1, V2, and V3 in which the blinking of the left and right turn signal lamps 43 and 44 has been detected once to be in a state in which the blinking of the left and right turn signal lamps 43 and 44 is detectable again, only in a case where the predetermined time period has elapsed.

Thus, the first traveling environment recognition section 11d may be able to recognize the blinking of the left and right turn signal lamps 43 and 44 even if the vehicles V1, V2, and V3 traveling in front of the own vehicle M use the LED light source in the brake lamps 41 and 42 and/or the left and right turn signal lamps 43 and 44. The lighting of the brake lamps 41 and 42 may be determined on the basis of whether the high mounted stop lamp 45 is lit.

The travel_ECU 22 may execute driving assistance such as adaptive cruise control or lane keeping control on the basis of the recognition control of the left and right turn signal lamps 43 and 44 of the other vehicles V1, V2, and V3 traveling in front of the own vehicle M performed by the first traveling environment recognition section 11d as described above.

In a case where reliability of the recognition of the lane lines LL and LR is low or the lane lines LL and LR are unrecognizable while driving assistance such as adaptive cruise control or lane keeping control is being executed, control has been executed in such a manner that the lane keep assist control is interrupted and the first vehicle V1 recognized as the preceding vehicle P1 is followed. For this reason, the own vehicle M performs steering control in accordance with the behavior of the first vehicle V1 during the adaptive cruise control.

As described above, in order to recognize the left and right turn signal lamps 43 and 44 of the vehicles V1, V2, and V3 including the brake lamps 41 and 42 each having the LED light source, the control has been performed in such a manner that, with respect to the corresponding one of the vehicles V1, V2, and V3 in which the blinking of the turn signal lamp 43 or 44 is detected once, the turn signal lamp recognition process thereafter is suppressed.

This can cause, while the lane keeping assist control is interrupted and adaptive cruise control is performed, steering control that causes the own vehicle M to deviate from the desired traveling course to be performed and causes great loss of steering control of the own vehicle M depending on the behavior of the first vehicle V1 serving as the preceding vehicle P1.

Figure 10:
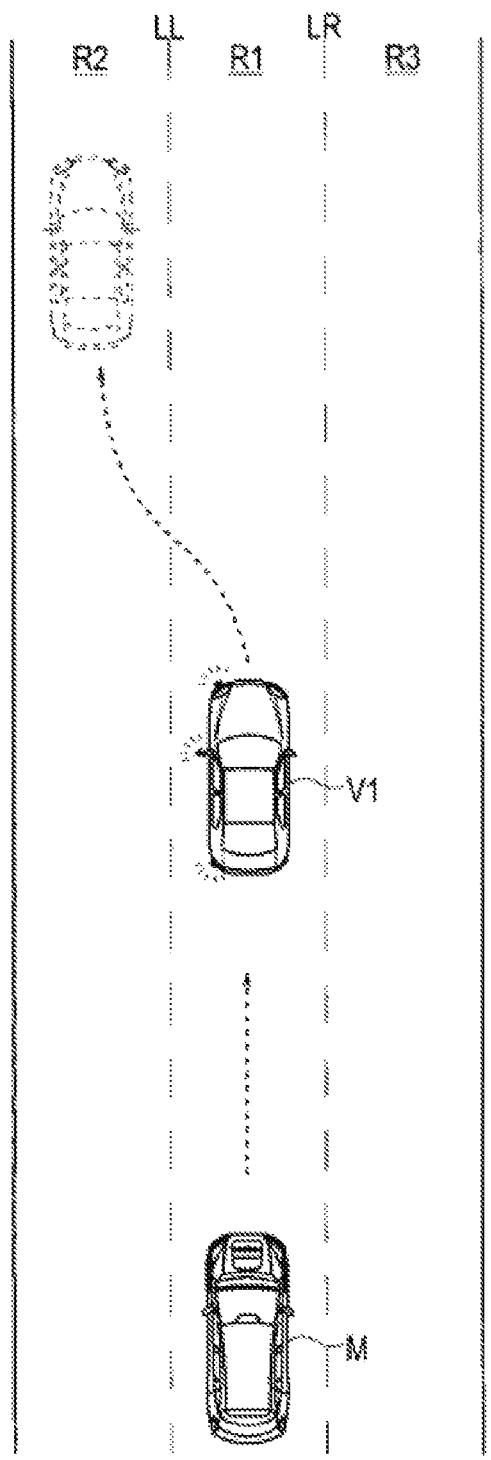
FIG. 10 is a diagram illustrating a state in which a preceding vehicle traveling along an own-vehicle traveling course is blinking the turn signal lamps and leaving the own-vehicle traveling course for a left traveling course.
Figure 11:
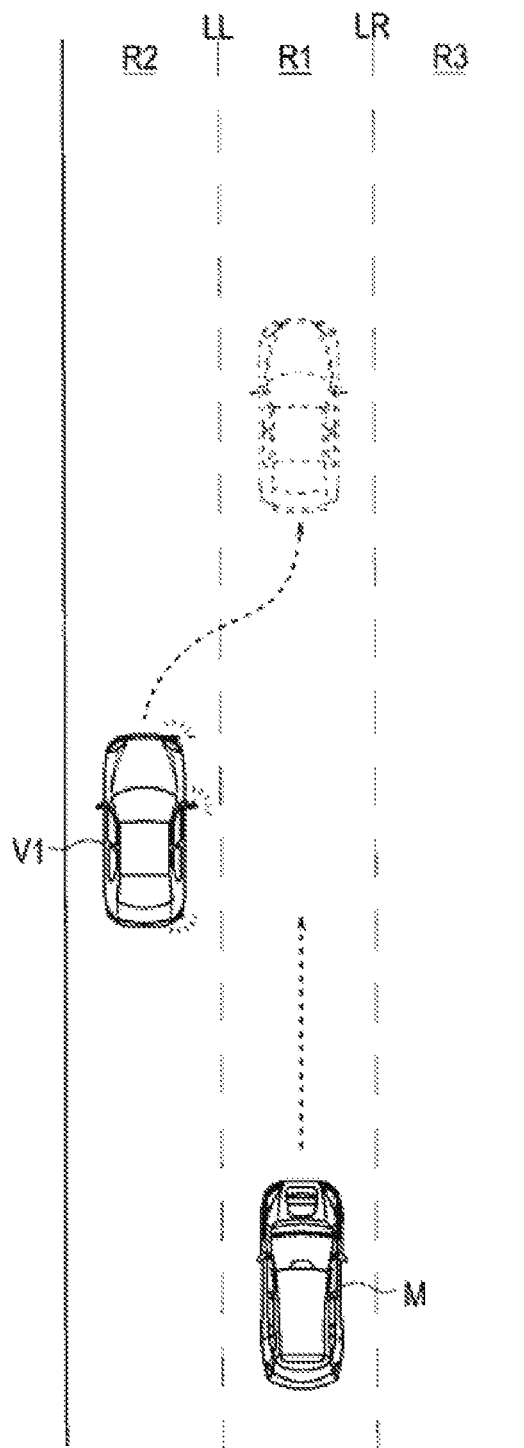
FIG. 11 is a diagram illustrating a state in which the preceding vehicle that has been traveling along the left traveling course is blinking the turn signal lamps and cutting into the own-vehicle traveling course.
Figure 12:
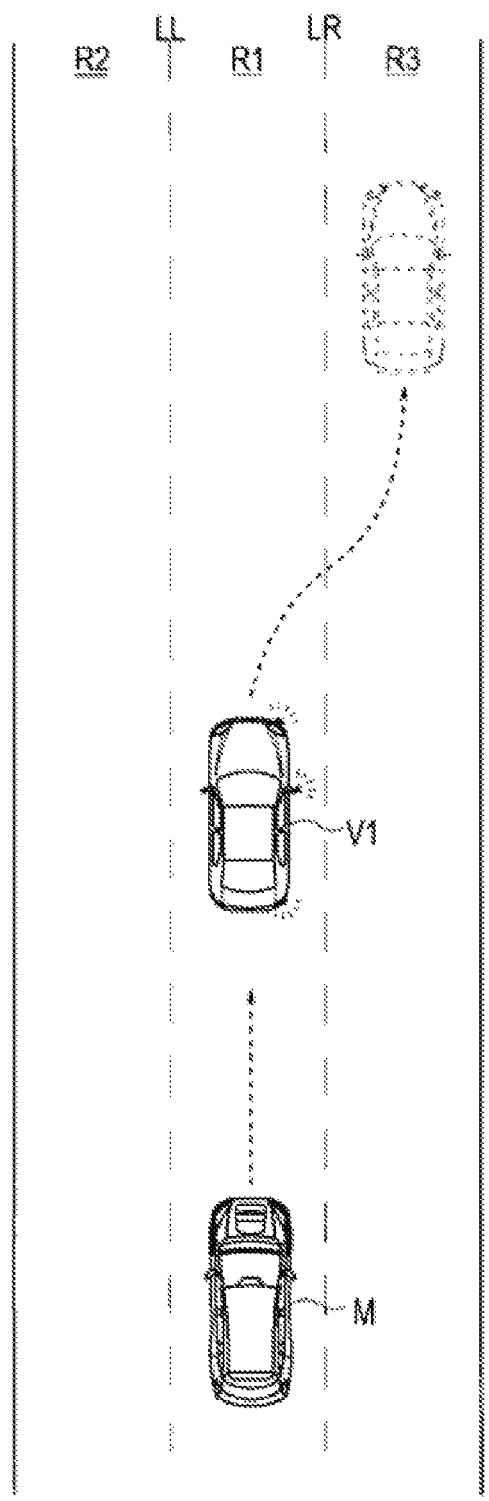
FIG. 12 is a diagram illustrating a state in which the preceding vehicle that has cut into the own-vehicle traveling course is blinking the turn signal lamps and leaving the own-vehicle traveling course for a right traveling course.

As one example of such control, there has been a case where the steering control that causes the own vehicle M to deviate from the desired traveling course is performed in a scene in which the following behavior is repeated: the first vehicle V1 serving as the preceding vehicle P1 blinks the left turn signal lamp 43 and makes a lane change to leave the traveling lane R1 for the left lane R2 as illustrated in FIG. 10; the first vehicle V1 thereafter cuts into the traveling lane R1 in front of the own vehicle M again (performs lane change) as illustrated in FIG. 11; and further, the first vehicle V1 leaves for the right lane R3 (or the left lane R2, although not illustrated) (performs lane change) as illustrated in FIG. 12.

In such a scene, while the own vehicle M performs the adaptive cruise control, in a case where the own vehicle M detects once the blinking of the left turn signal lamp 43 of the first vehicle V1 serving as the preceding vehicle P1 and the first vehicle V1 thereafter leaves for the left lane R2 from the front of the own vehicle M on the traveling lane R1 to be the left parallel-traveling vehicle as illustrated in FIG. 10, the own vehicle M has not recognized the blinking of the left turn signal lamp 43 of the relevant first vehicle V1. Thus, the own vehicle M has been unable to perform deceleration control when the first vehicle V1 cuts in front of the own vehicle M on the traveling lane R1 as illustrated in FIG. 11.

Further, when the first vehicle V1 leaves the traveling lane R1 for the right lane R3 (or the left lane R2 again, although not illustrated) as illustrated in FIG. 12, the steering control in such a manner that the own vehicle M follows the first vehicle V1 has been executed in the case where the reliability of the recognition of the lane lines LL and LR is low or the lane lines LL and LR are unrecognizable.

Accordingly, in the travel control system 1 of the own vehicle M, the travel_ECU 22 serving as the vehicle driving assistance device may perform the deceleration control and may suppress the steering control that causes the own vehicle M to deviate from the desired traveling course (traveling lane R1) to thereby execute control to suppress great loss of the steering control of the own vehicle M, on the basis of the data of other vehicles recognized by the first traveling environment recognition section 11d. This control may be executed even in the case where, while executing driving assistance in which the adaptive cruise control and the lane keeping control are combined, the behavior of the first vehicle V1 serving as the preceding vehicle P1 which the own vehicle M follows is such that the first vehicle V1 changes lanes by repeatedly performing leaving and cutting in between the traveling lane R1 and the right lane R3 (or the left lane R2) as illustrated in FIGS. 10 to 12, for example.

In detail, a control example to be performed in the travel control apparatus 10 of the travel control system 1 will be described with reference to flowcharts illustrated in FIGS. 13 and 14. The control example is to be executed by the travel_ECU 22 on the basis of the data of other vehicles recognized by the first traveling environment recognition section 11d during the adaptive cruise control with respect to the first vehicle V1 serving as the preceding vehicle P1.

Figure 13:
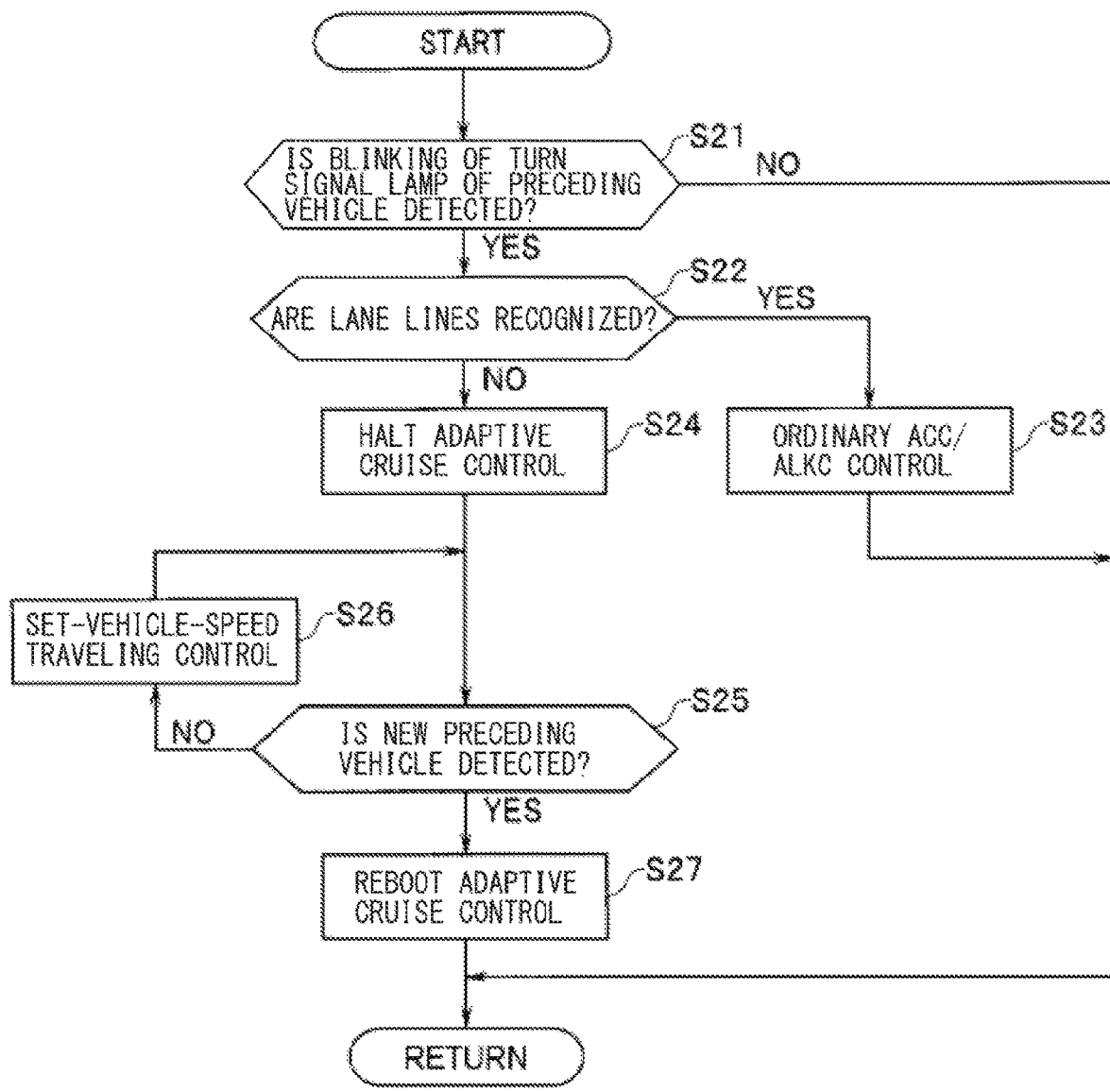
FIG. 13 is a flowchart illustrating a control example to be performed at a time of detecting a turn signal lamp of a preceding vehicle while performing driving assistance.

First, a control example will be described which is illustrated in FIG. 13 and executed by the travel_ECU 22 when the first vehicle V1 blinks the left turn signal lamp 43 and leaves the traveling lane R1 for either one of the left lane R2 and the right lane R3. In FIG. 13, the control example will be described which is executed by the travel_ECU 22, in the scene in which the first vehicle V1 serving as the preceding vehicle P1 blinks the left turn signal lamp 43 and leaves the traveling lane R1 along which the own vehicle M is traveling for the left lane R2, as illustrated in FIG. 10.

As illustrated in FIG. 13, the travel_ECU 22 may determine whether the first traveling environment recognition section 11d detects the blinking of the left turn signal lamp 43 of the preceding vehicle P1 (S21). If the first traveling environment recognition section 11d does not detect the blinking of the left turn signal lamp 43 of the preceding vehicle P1 (S21: NO), the travel_ECU 22 may cause the process to exit the routine and return to step S21.

If the first traveling environment recognition section 11d detects the blinking of the left turn signal lamp 43 of the preceding vehicle P1 (S21: YES), the travel_ECU 22 may determine whether the first traveling environment recognition section 11d recognizes the lane lines LL and LR (S22). At this time, if the first traveling environment recognition section 11d recognizes the lane lines LL and LR (S22: YES), the travel_ECU 22 may execute the ordinary control in which the adaptive cruise control and the lane keeping control are combined (S23), may cause the process to exit the routine and return to step S21.

In step S22, if the reliability of recognition of the lane lines LL and LR is low or if the lane lines LL and LR are unrecognizable (S22: NO), the travel_ECU 22 may temporarily halt the adaptive cruise control with respect to the preceding vehicle P1 (S24).

In this state, the travel_ECU 22 may determine whether the first traveling environment recognition section 11d detects a new preceding vehicle P1 (S25). If no new preceding vehicle P1 is detected (S25: NO), the travel_ECU 22 may execute traveling control based on a set vehicle speed (S26) and may cause the process to return to step S25. In other words, until the new preceding vehicle P1 is detected and recognized, the travel_ECU 22 may execute the traveling control based on the set vehicle speed.

If the new preceding vehicle P1 is detected in step S25 (S25: YES), the travel_ECU 22 may reboot the adaptive cruise control that has been halted (S27), may cause the process to exit the routine and return to step S21. In other words, the travel_ECU 22 may execute the adaptive cruise control with respect to the new preceding vehicle P1.

It is to be noted that the travel_ECU 22 may execute the control routine of FIG. 13 by reversely reading the left and right in the scene in which the preceding vehicle P1 blinks the right turn signal lamp 44 and leaves the traveling lane R1 for the right lane R3 as illustrated in FIG. 12.

Next, a control example will be described with reference to FIG. 14 which is executed by the travel_ECU 22 when the left and right vehicles V2 and V3 each traveling along either one of the left lane R2 and the right lane R3 blink the left and right turn signal lamps 43 and 44 to cut into the traveling lane R1.

Figure 14:
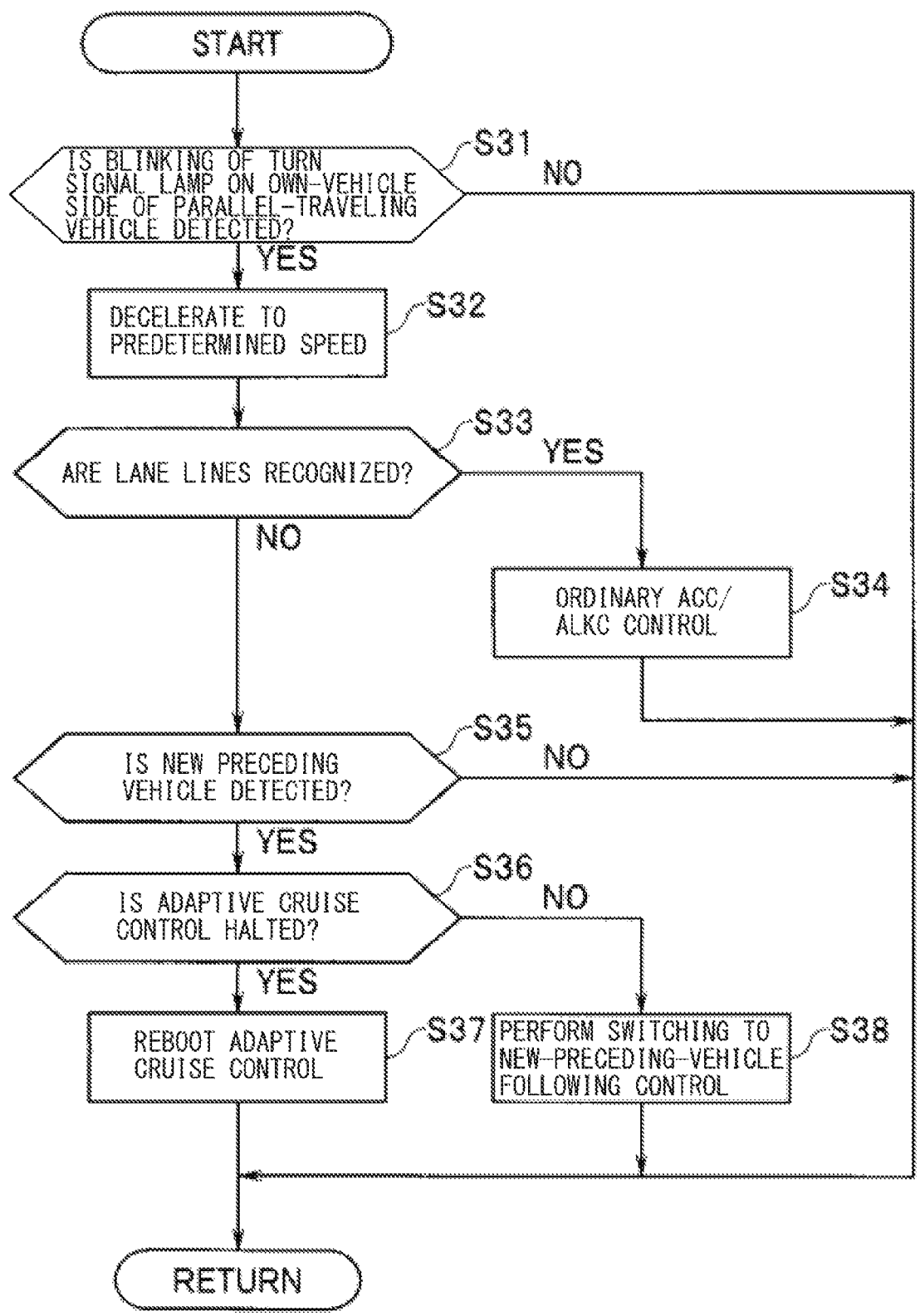
FIG. 14 is a flowchart illustrating a control example to be performed at a time of detecting a turn signal lamp of a parallel-traveling vehicle while performing driving assistance.

In FIG. 14, the control example will be described which is executed by the travel_ECU 22 in the scene in which the second vehicle V2 serving as the left parallel-traveling vehicle P2 blinks the right turn signal lamp 44 and cuts into, from the left lane R2, the traveling lane R1 along which the own vehicle M is traveling, as illustrated in FIG. 11.

The travel_ECU 22 may determine whether the first traveling environment recognition section 11*d* detects the blinking of the right turn signal lamp 44 of the left parallel-traveling vehicle P2 (S31). If the first traveling environment recognition section 11*d* does not detect the blinking of the right turn signal lamp 44 (S31: NO), the travel_ECU 22 may cause the process to exit the routine and return to step S31.

If the first traveling environment recognition section 11*d* detects the blinking of the right turn signal lamp 44 (S31: YES), the travel_ECU 22 may cause the own vehicle M to decelerate to a predetermined speed (S32). The travel_ECU 22 may control the BK_ECU 25 to drive the brake actuator 29 to decelerate the own vehicle M to the predetermined speed, until a distance between the own vehicle M and the left parallel-traveling vehicle P2, for example, becomes a predetermined inter-vehicular distance corresponding to the vehicle speed of the own vehicle M.

Thereafter, the travel_ECU 22 may determine whether the first traveling environment recognition section 11*d* recognizes the lane lines LL and LR (S33). If the first traveling environment recognition section 11*d* recognizes the lane lines LL and LR (S33: YES), the travel_ECU 22 may execute the ordinary control in which the adaptive cruise control and the lane keeping control are combined (S34), may cause the process to exit the routine and return to step S31.

In step S33, if the reliability of recognition of the lane lines LL and LR is low or if the lane lines LL and LR are unrecognizable (S33: NO), the travel_ECU 22 may determine whether the first traveling environment recognition section 11*d* detects a new preceding vehicle P1 (S35).

As illustrated in FIGS. 10 and 11, in the scene in which the first vehicle V1 leaves the traveling lane R1 for the left lane R2 and thereafter cuts into the traveling lane R1 again, the first vehicle V1 may be recognized as the new preceding vehicle P1.

If the new preceding vehicle P1 is detected in step S35 (S35: YES), the travel_ECU 22 may determine whether the adaptive cruise control is temporarily halted (S36).

If the adaptive cruise control is temporarily halted (S36: YES), the travel_ECU 22 may reboot the adaptive cruise control that has been halted (S37), and may cause the process to exit the routine and return to step S31. In other words, the travel_ECU 22 may recognize the second vehicle V2 as the preceding vehicle P1 and may execute the adaptive cruise control with respect to the preceding vehicle P1.

If the adaptive cruise control is not temporarily halted (S36: NO), the travel_ECU 22 may perform control in which the vehicle to be followed is switched to the new preceding vehicle P1 (S38), and may cause the process to exit the routine and return to step S31. In other words, the travel_ECU 22 is in a state of performing the adaptive cruise control with respect to another vehicle, and thus may switch the vehicle to be followed to the second vehicle V2 which has cut into the traveling lane R1 from the left lane R2 as the new preceding vehicle P1, and may execute the adaptive cruise control with respect to the second vehicle V2.

If the right parallel-traveling vehicle P3 blinks the left turn signal lamp 43 and cuts into the traveling lane R1 from the right lane R3, the travel_ECU 22 may execute the control routine of FIG. 14 by reversely reading the left and right.

As described above, in the travel control apparatus 10 of the travel control system 1, the travel_ECU 22 may execute the control in which the adaptive cruise control and the lane keeping control are combined on the basis of a result of detecting the left and right turn signal lamps 43 and 44 of the other vehicles V1, V2, and V3 by the first traveling environment recognition section 11*d*.

The lighting of the tail lamps and the left and right brake lamps 41 and 42 each having the PWM-controlled LED light source may be detected to be flickering light, and this may cause the lighting of the brake lamps 41 and 42 to be erroneously recognized as the blinking of the left and right turn signal lamps 43 and 44. The first traveling environment recognition section 11*d* makes it possible to suppress this erroneous recognition.

In addition, after the predetermined time period has elapsed from the previous detection of the turn signal lamp of any one of the vehicles V1, V2, and V3, the first traveling environment recognition section 11*d* turns into the state for executing the process of determining the turn signal lamp of the corresponding one of the vehicles V1, V2, and V3 again.

As described above, while the travel control apparatus 10 of the travel control system 1 performs the adaptive cruise control when the reliability of the recognition of the lane lines LL and LR is low or the lane lines LL and LR are unrecognizable, the first traveling environment recognition section 11*d* turns into the state in which the process of determining the turn signal lamp of the corresponding one of the vehicles V1, V2, and V3 is executable repeatedly after the predetermined time period has elapsed from the previous detection of the turn signal lamp.

Accordingly, in the scene in which each of the vehicles V1, V2, and V3 repeatedly performs leaving for the left lane R2 or the right lane R3 from the traveling lane R1 and cutting into the traveling lane R1 from the left lane R2 or the right lane R3, for example, the travel control apparatus 10 is able to decelerate the own vehicle M, and to suppress the steering control that follows a behavior of the preceding vehicle which deviates from the desired traveling course, thereby suppressing the great loss of the steering control of the own vehicle M.

Figure 15:
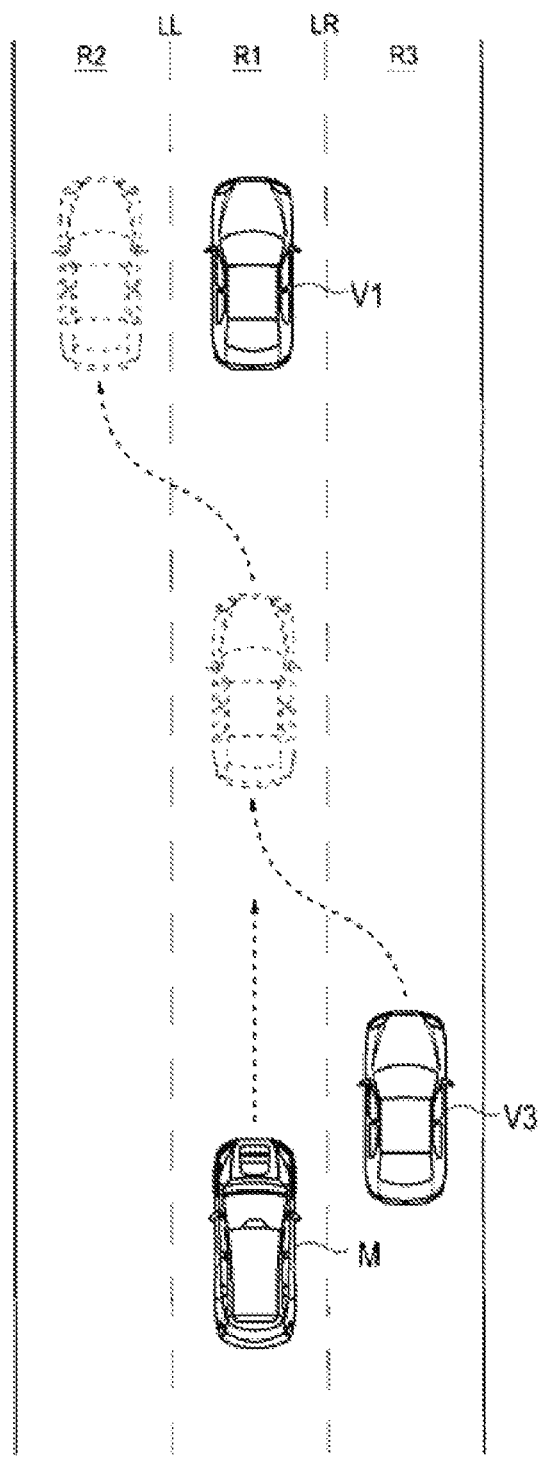
FIG. 15 is a diagram illustrating a scene in which a right parallel-traveling vehicle is changing lanes, without blinking a turn signal lamp, from a right lane to an own lane and from the own lane to a left lane.

Incidentally, during the adaptive cruise control when the reliability of the recognition of the lane lines LL and LR is low or the lane lines LL and LR are unrecognizable, the right and left parallel-traveling vehicles P2 and P3 may change lanes without blinking (lighting) the left and right turn signal lamps 43 and 44. In one example, there may be a scene in which, as illustrated in FIG. 15, the third vehicle V3 serving as the right parallel-traveling vehicle P3 here cuts into the traveling lane R1 without blinking the left turn signal lamp 43, and subsequently leaves for the left lane R2 (changes lanes).

In such a scene, the left turn signal lamp 43 of the third vehicle V3 is not detected. Thus, steering control in which the own vehicle M follows the third vehicle V3 that has cut into the traveling lane R1 is executed, which may cause great loss of the steering control.

Figure 16:
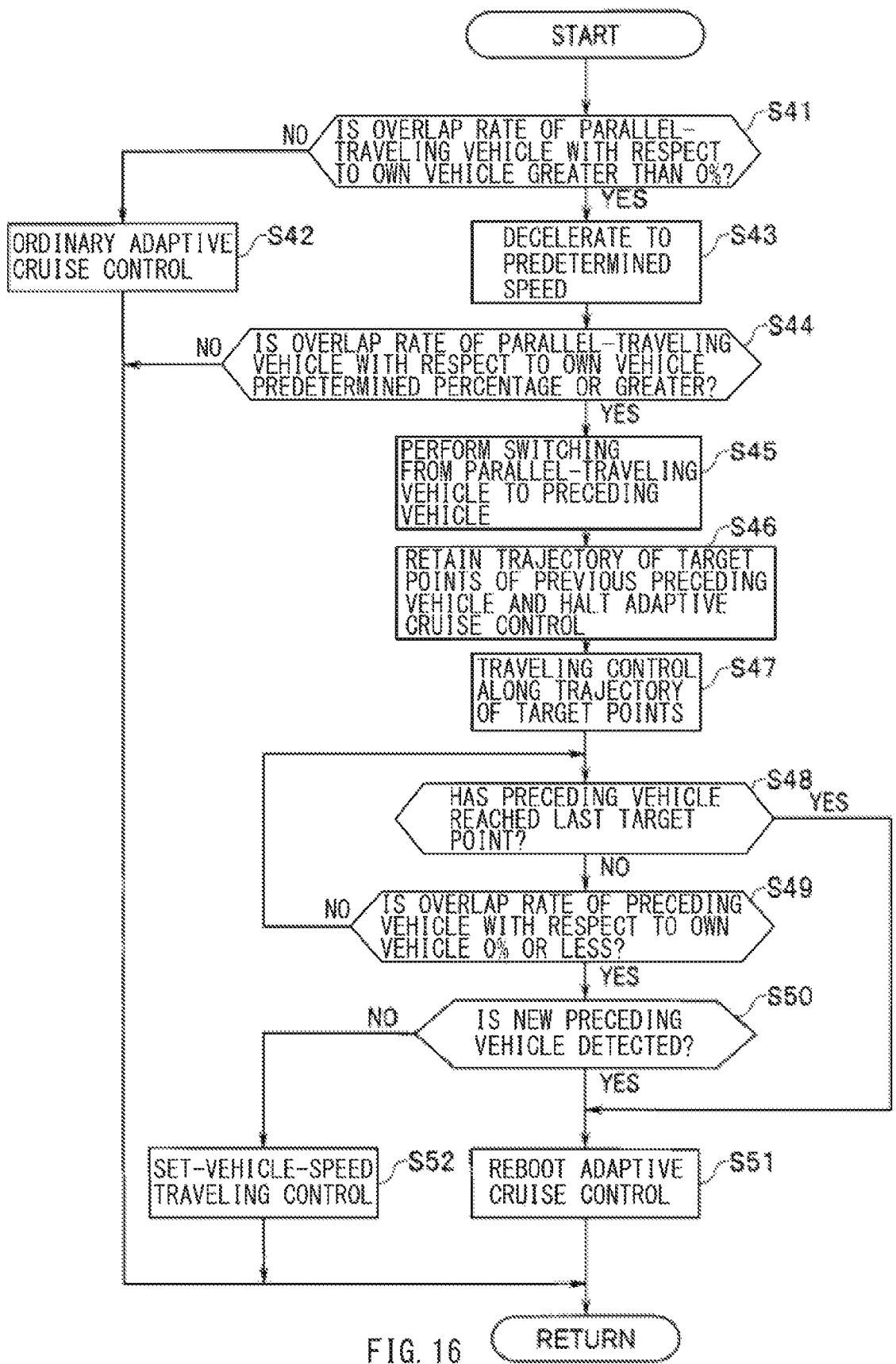
FIG. 16 is a flowchart illustrating a control example to be performed during driving assistance, in a scene in which a parallel-traveling vehicle has changed lanes without blinking a turn signal lamp.

In such a scene, the travel control apparatus 10 of the travel control system 1 may execute a control example illustrated in a flowchart of FIG. 16. In FIG. 16, a state where the third vehicle V3 traveling along the right lane R3 is recognized as the right parallel-traveling vehicle P3 will be exemplified.

As illustrated in FIG. 16, during the adaptive cruise control when the reliability of the recognition of the lane lines LL and LR is low or the lane lines LL and LR are unrecognizable, the travel_ECU 22 of the travel control apparatus 10 may determine whether an overlap rate of the third vehicle V3 serving as the right parallel-traveling vehicle P3 traveling along the right lane R3 with respect to the own vehicle M is greater than 0% on the basis of the traveling-environment image data of the first traveling environment recognition section 11d (S41).

Figure 17:
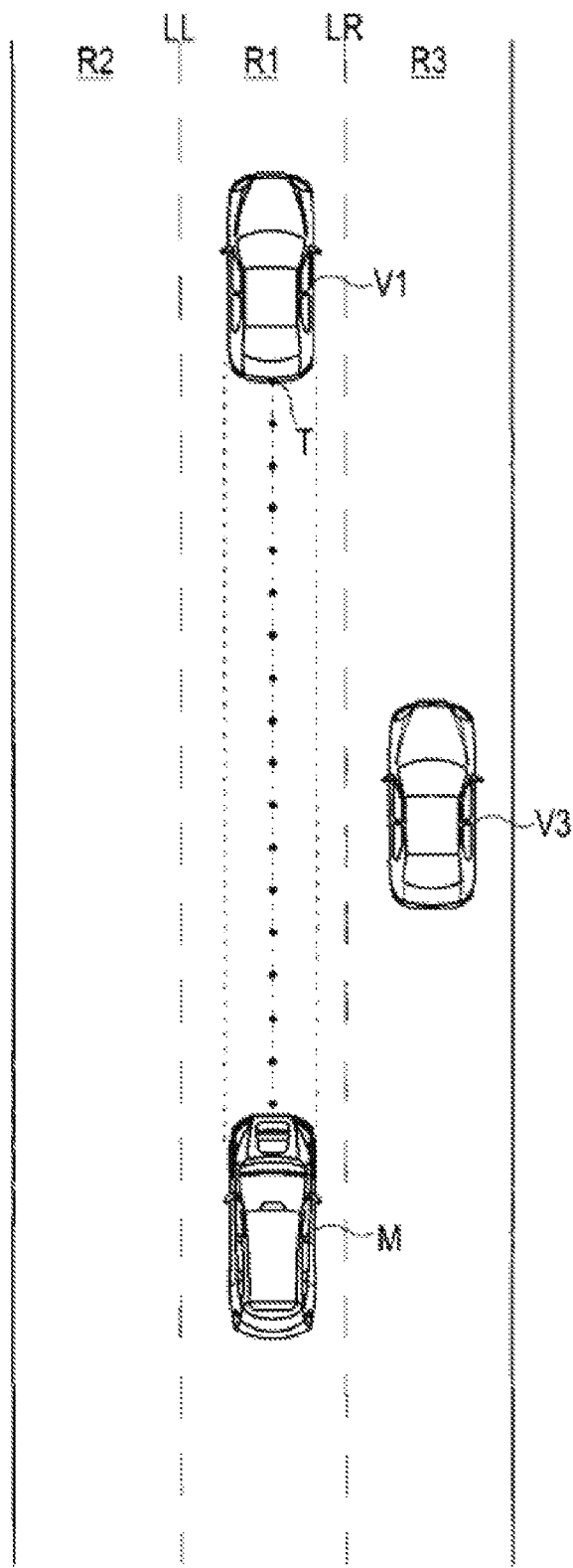
FIG. 17 is a diagram illustrating a state during traveling control along trajectory data of target points of the preceding vehicle.

If the overlap rate of the right parallel vehicle P3 with respect to the own vehicle M is 0% or less (S41: NO), the travel_ECU 22 may cause the process to exit the routine and return to step S41. As illustrated in FIG. 17, for example, this is a state in which the right parallel-traveling vehicle P3 is traveling along the right lane R3 and traveling control is executed along a trajectory of target points T of the preceding vehicle V1 stored in the own vehicle M.

Figure 18:
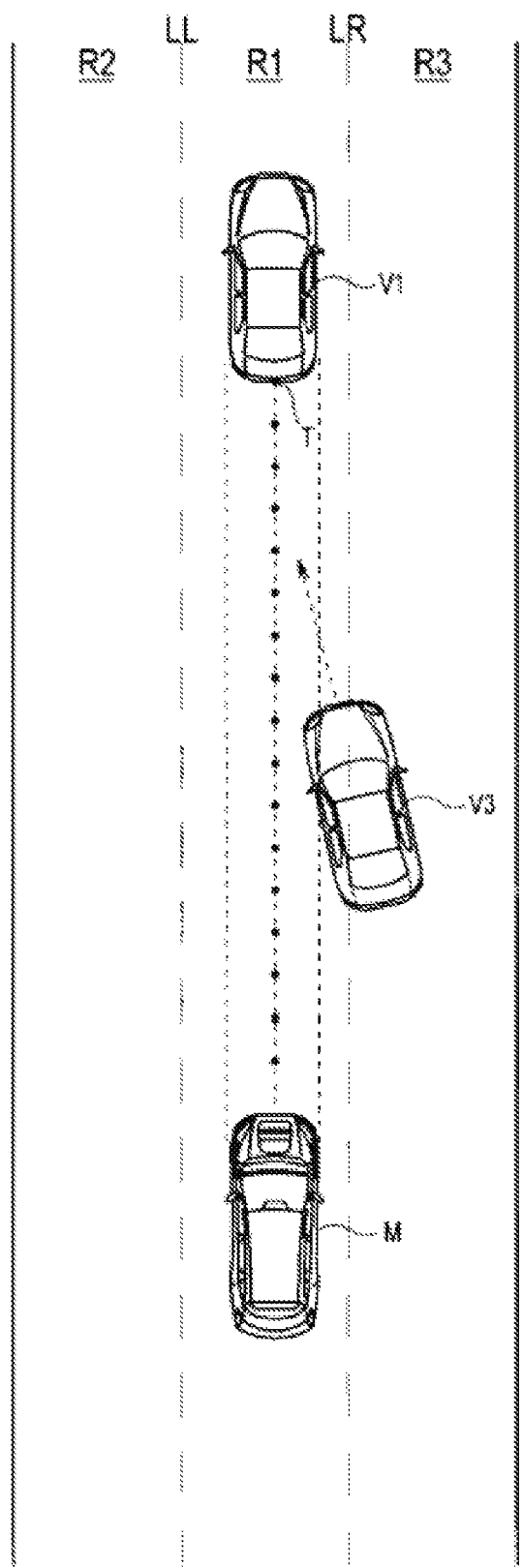
FIG. 18 is a diagram illustrating a state in which the right parallel-traveling vehicle cuts into the own lane and overlaps with the own vehicle at a predetermined rate.

If the recognized overlap rate of the right parallel-traveling vehicle P3 with respect to the own vehicle M becomes 0% or greater (S41: YES), the own vehicle M may be decelerated to a predetermined speed (S43). As illustrated in FIG. 18, for example, this is a state in which the right parallel-traveling vehicle P3 cuts into the traveling lane R1 from the right lane R3 without lighting the left turn signal lamp 43.

The travel_ECU 22 may control the BK_ECU 25 to drive the brake actuator 29 to decelerate the own vehicle M to the predetermined speed, until a distance between the own vehicle M and the right parallel-traveling vehicle P3, for example, becomes a predetermined inter-vehicular distance corresponding to the vehicle speed of the own vehicle M.

The travel_ECU 22 may determine whether the overlap rate of the third vehicle V3 serving as the right parallel-traveling vehicle P3 traveling along the right lane R3 with respect to the own vehicle M is a predetermined percentage (e.g., 100%) or greater (S44). If the overlap rate of the right parallel-traveling vehicle P3 with respect to the own vehicle M is less than the predetermined percentage (S44: NO), the travel_ECU 22 may cause the process to exit the routine and return to step S41.

Figure 19:
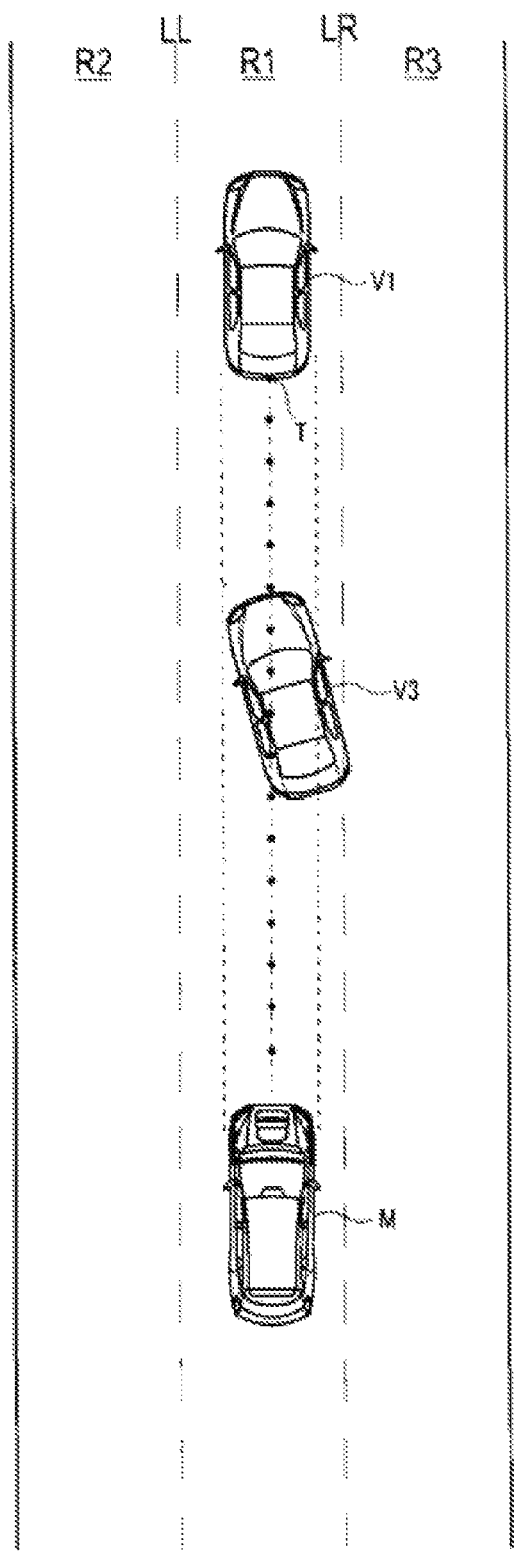

If the overlap rate of the right parallel-traveling vehicle P3 with respect to the own vehicle M is the predetermined percentage or greater (S44: YES), the travel_ECU 22 may switch the recognition of the third vehicle V3 from the right parallel-traveling vehicle P3 to a new preceding vehicle P1 (S45). As illustrated in FIG. 19, for example, this is a state in which the third vehicle V3 cuts into the traveling lane R1 in front of the own vehicle M.

If the third vehicle V3 is recognized as the new preceding vehicle P1, the travel_ECU 22 may retain the trajectory of the target points T of the original preceding vehicle P1 (the first vehicle V1 serving as a previous preceding vehicle) stored at the time of switching of the preceding vehicle P1, and may temporarily halt the adaptive cruise control with respect to the preceding vehicle P1 (S46). Thereafter, the travel_ECU 22 may perform traveling control along the stored trajectory data of the target points T (S47). In other words, the travel_ECU 22 may retain the stored trajectory of the target points T of the original preceding vehicle P1 (the first vehicle V1 to serving as the previous preceding vehicle), and may execute the traveling control in accordance with the trajectory data of the original preceding vehicle P1 (the first vehicle V1), not the adaptive cruise control with respect to the new preceding vehicle P1 (the third vehicle V3). It is to be noted that the trajectory data to be stored and retained may be obtained by estimating and extending the trajectory of the target points T of the original preceding vehicle P1 (the first vehicle V1).

The adaptive cruise control may not be performed with respect to the third vehicle V3 recognized as the preceding vehicle P1. The trajectory of the target points T of the first vehicle V1 which has been the preceding vehicle P1 before the third vehicle V3 cut into the traveling lane R1 may be retained, and the traveling control along such trajectory data of the target points T may be executed.

The travel_ECU 22 may determine whether the currently recognized preceding vehicle P1 has reached the last stored target point T (S48), and may determine whether or not the overlap rate of the preceding vehicle P1 with respect to the own vehicle M is 0% or less (S49).

If the overlap rate of the preceding vehicle P1 with respect to the own vehicle M is not 0% or less (S49: NO), the process may return to step S48, and if the overlap rate is 0% or less (S49: YES), whether a new preceding vehicle P1 is detected may be determined in step S50.

Figure 20:
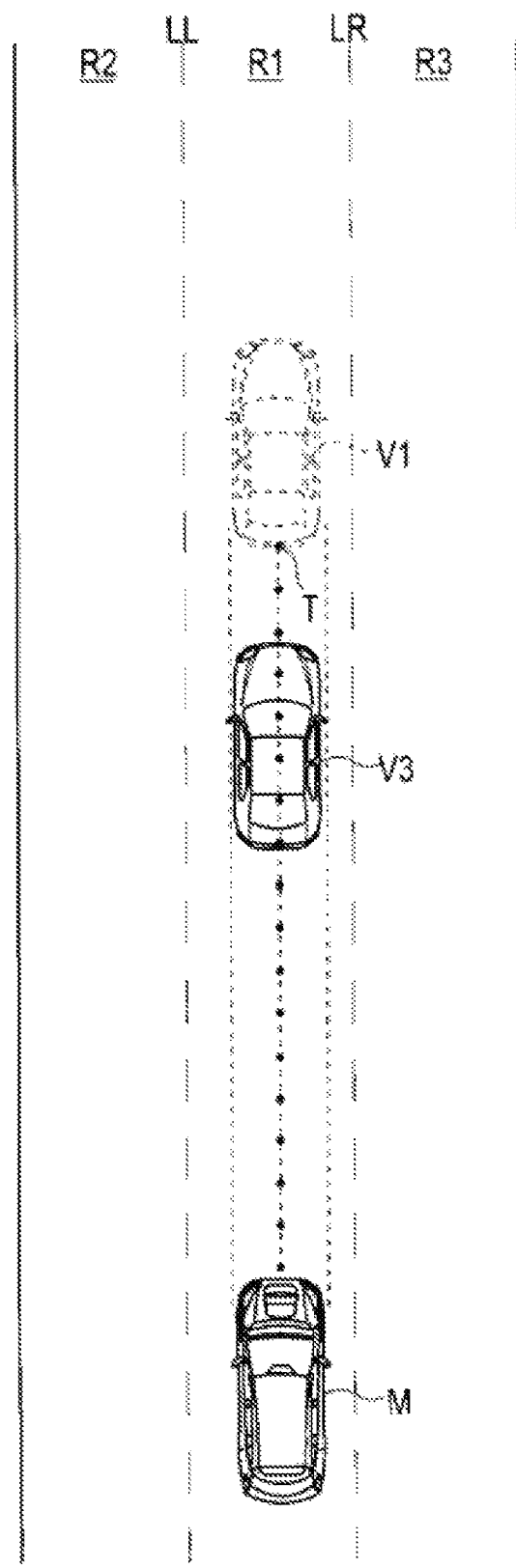
FIG. 20 is a diagram illustrating a state in which traveling is being performed along the trajectory data of the original preceding vehicle.
Figure 21:
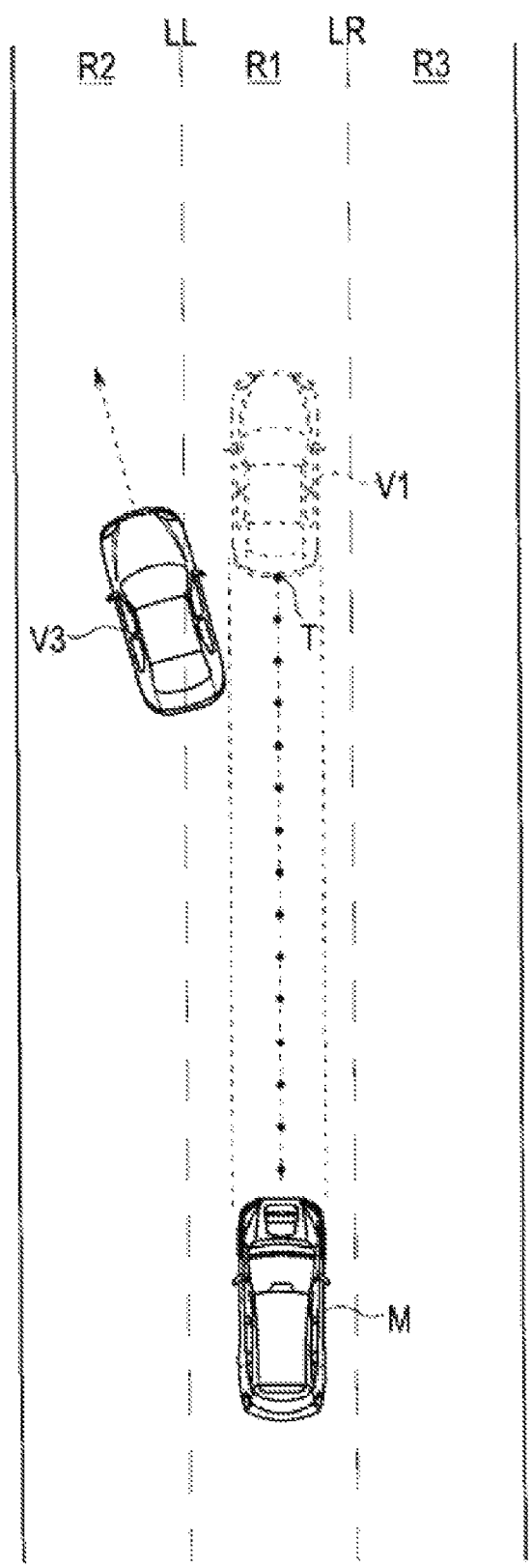
FIG. 21 is a diagram illustrating a state in which the vehicle which has cut in is leaving the own lane for the left lane.
Figure 22:
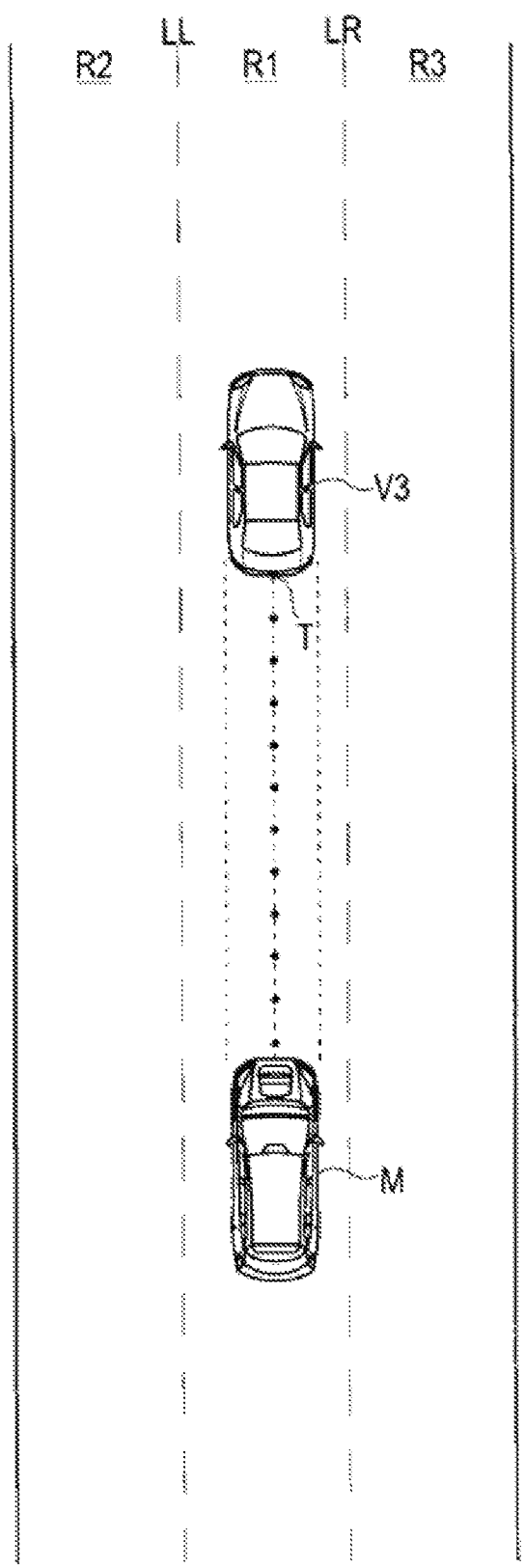
FIG. 22 is a diagram illustrating a state in which the vehicle which has cut in reaches a limit position of the trajectory data.

It is to be noted that, the case where the overlap rate of the preceding vehicle P1 with respect to the own vehicle M is not 0% or less may represent, for example, a state in which the third vehicle V3 is traveling ahead along the traveling lane R1 as illustrated in FIG. 20, and the case where the overlap rate is 0% or less may represent, for example, a state in which the third vehicle V3 leaves for another lane, e.g., the left lane R2, as illustrated in FIG. 21. The case where the overlap rate is 0% or less may also represent a state in which the third vehicle V3 leaves for the right lane R3 again.

The determination of step S49 may be executed until the preceding vehicle P1 of step S48 reaches the last target point T unless the overlap rate of the preceding vehicle P1 with respect to the own vehicle M becomes 0% or less. In the case where the new preceding vehicle P1 which has cut into the traveling lane R1 leaves the traveling lane R1 for another lane, which is the left lane R2 here, to change lanes, as it is, the travel_ECU 22 may execute the traveling control along the trajectory data of the target points T of the first vehicle V1 that is stored and retained in the travel_ECU 22, and may suppress loss of the steering control of the own vehicle M.

Regarding the preceding vehicle P1 of step S48 reaching the last target point T, as illustrated in FIG. 21, for example, the third vehicle V3 may travel ahead along the traveling lane R1, and the travel_ECU 22 may determine a limit position at which the third vehicle V3 reaches the last target point T of the first vehicle V1 serving as the original preceding vehicle P1.

If, in step S48, the travel_ECU 22 determines that the third vehicle V3 serving as the preceding vehicle P1 has reached the last target point T (S48: YES), or if, in step S50, the travel_ECU 22 detects a new preceding vehicle P1 that is not the third vehicle V3 (S50: YES), the travel_ECU 22 may reboot the adaptive cruise control that has been halted from the traveling control based on the trajectory data (S51), and may cause the process to exit the routine and return to step S41.

In other words, the adaptive cruise control may be rebooted at the limit position of the trajectory data of the target points T of the original preceding vehicle P1 which has been stored and retained, with the third vehicle V3 serving as the right parallel-traveling vehicle P3 which has cut into the way as the preceding vehicle P1. In addition, in a case where a new preceding vehicle P1 that is not the third vehicle V3 is detected, the adaptive cruise control with respect to the new preceding vehicle P1 may be rebooted.

In step S50, if no new preceding vehicle P1 has been detected (S50: NO), the travel_ECU 22 may execute traveling control based on a set vehicle speed (S52) and may cause the process to exit the routine and return to step S41.

It is to be noted that the travel_ECU 22 may execute the control routine of FIG. 16 by reversely reading the left and right in the scene in which the left parallel-traveling vehicle P2 traveling along the left lane R2 cuts into the traveling lane R1 and leaves the traveling lane R1 for the right lane R3 or again for the left lane R2.

As described above, in the travel control apparatus 10 of the travel control system 1, the travel_ECU 22 may execute the traveling control that retains the trajectory data of the target points T of the original preceding vehicle P1, even if one of the left and right parallel-traveling vehicles P2 and P3 changes lane to the traveling lane R1 along which the own vehicle M travels without blinking the left and right turn signal lamps 43 and 44 during the adaptive cruise control when the reliability of the recognition of the lane lines LL and LR is low or the lane lines LL and LR are unrecognizable.

In other words, when the travel_ECU 22 switches the preceding vehicle P1 from the original preceding vehicle P1 to any one of the left and right parallel-traveling vehicles P2 and P3 serving as the new preceding vehicle P1, the travel_ECU 22 may halt the adaptive cruise control until the preceding vehicle P1 reaches the stored limit position of the last target point T of the trajectory data and may perform the traveling control in accordance with the trajectory data of the target points T of the original preceding vehicle P1.

The travel_ECU 22 executes traveling control in which the own vehicle M is prevented from following the new preceding vehicle P1 that has cut in and the following of the new preceding vehicle P1 is not performed up to the limit position of the trajectory data of the target points T of the original preceding vehicle P1. Thus, it is possible to suppress the steering control that causes the own vehicle M to deviate from the desired traveling course and to suppress the great loss of the steering control of the own vehicle M.

If the vehicle which has cut in reaches the limit position of the last target point T of the retained trajectory data, the travel_ECU 22 may reboot the adaptive cruise control. Further, in a case where the vehicle which has cut in leaves the traveling lane R1 for another lane prior to reaching the limit position, the travel_ECU 22 may reboot the halted adaptive cruise control if the travel_ECU 22 newly recognizes the new preceding vehicle P1, and may execute the traveling control based on the set vehicle speed if the travel_ECU 22 does not newly recognize the preceding vehicle P1.

Figure 23:
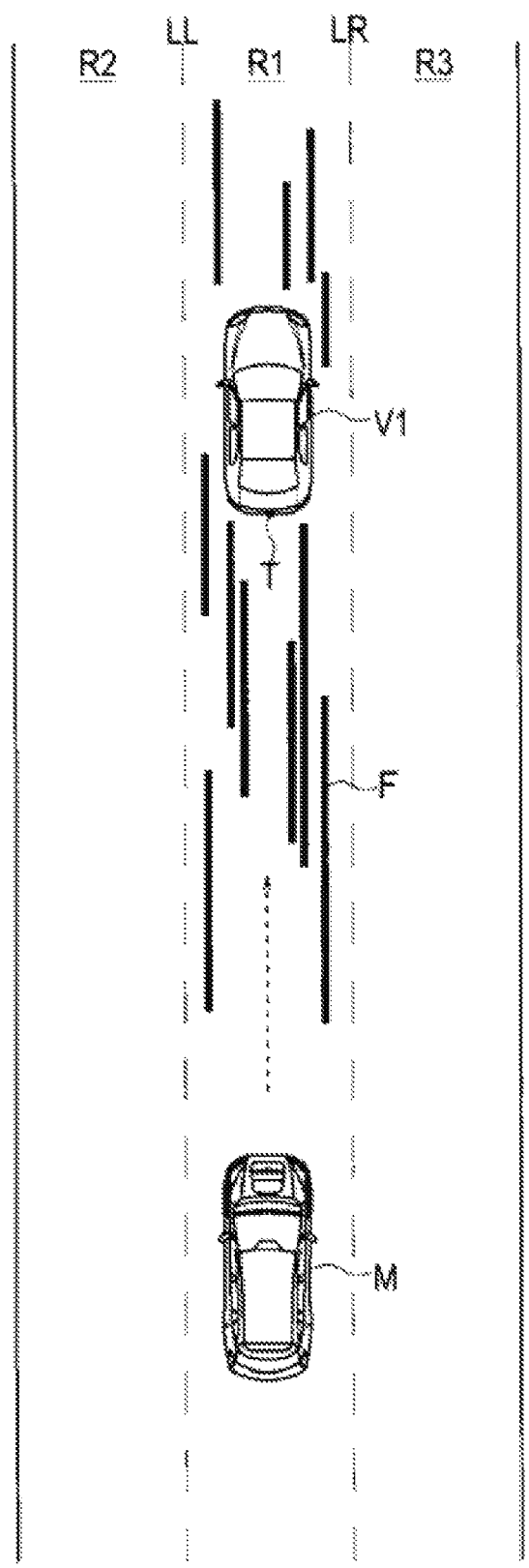
FIG. 23 is a diagram illustrating a state in which, when following a preceding vehicle, the lane lines are not recognized due to wheel marks on snow.

Incidentally, in a case where the preceding vehicle P1 has not traveled between the lane lines LL and LR in a most recent predetermined time period or in a state where the traveling environment recognition section 11d is unable to recognize the lane lines LL and LR during the adaptive cruise control, there may be a scene in which the first vehicle V1 crosses over a wheel trace (rut) F, etc., on a snow-covered road surface, as illustrated in FIG. 23, for example. In such a scene, the first traveling environment recognition section 11d can erroneously recognize the tire trace F as the lane lines LL and LR.

In this way, the travel_ECU 22 may regard such a scene in which the preceding vehicle P1 crosses over the wheel trace F which is erroneously recognized as the lane lines LL and LR, as the lane change of the preceding vehicle P1. The travel_ECU 22 may perform control in such a manner that the target points T following the preceding vehicle P1 do not come close to the lane lines LL and LR, or may cancel the adaptive cruise control.

Figure 24:
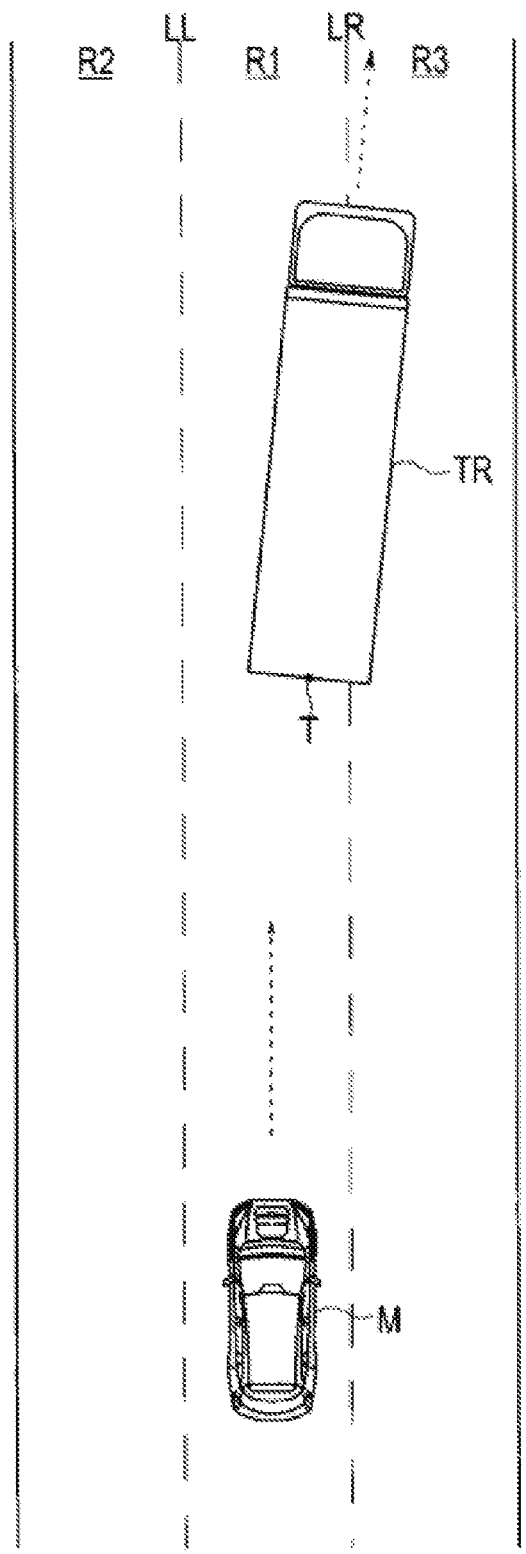
FIG. 24 is a diagram illustrating a state in which a truck, which is a preceding vehicle, crosses over the lane line when changing lanes.

In addition, as illustrated in FIG. 24, for example, in a case where a heavy vehicle such as a truck TR serving as the preceding vehicle P1 crosses over the lane lines LL and LR when changing lanes and where the reliability of the recognition of the lane lines LL and LR decreases similarly, the travel_ECU 22 may execute cancellation of the adaptive cruise control.

However, in the case where the preceding vehicle P1 has not traveled between the lane lines LL and LR in the most recent predetermined time period or in the state where the traveling environment recognition section 11d is unable to recognize the lane lines LL and LR, there may be a scene in which the first vehicle V1 crosses over the wheel trace F, etc., on a snow-covered road surface, for example. In such a scene, the control performed by the travel_ECU 22 in such a manner that the target points T following the preceding vehicle P1 do not come close to the lane lines LL and LR has been a cause of the great loss of the steering control of the own vehicle M and the deviation from the desired traveling course.

Figure 25:
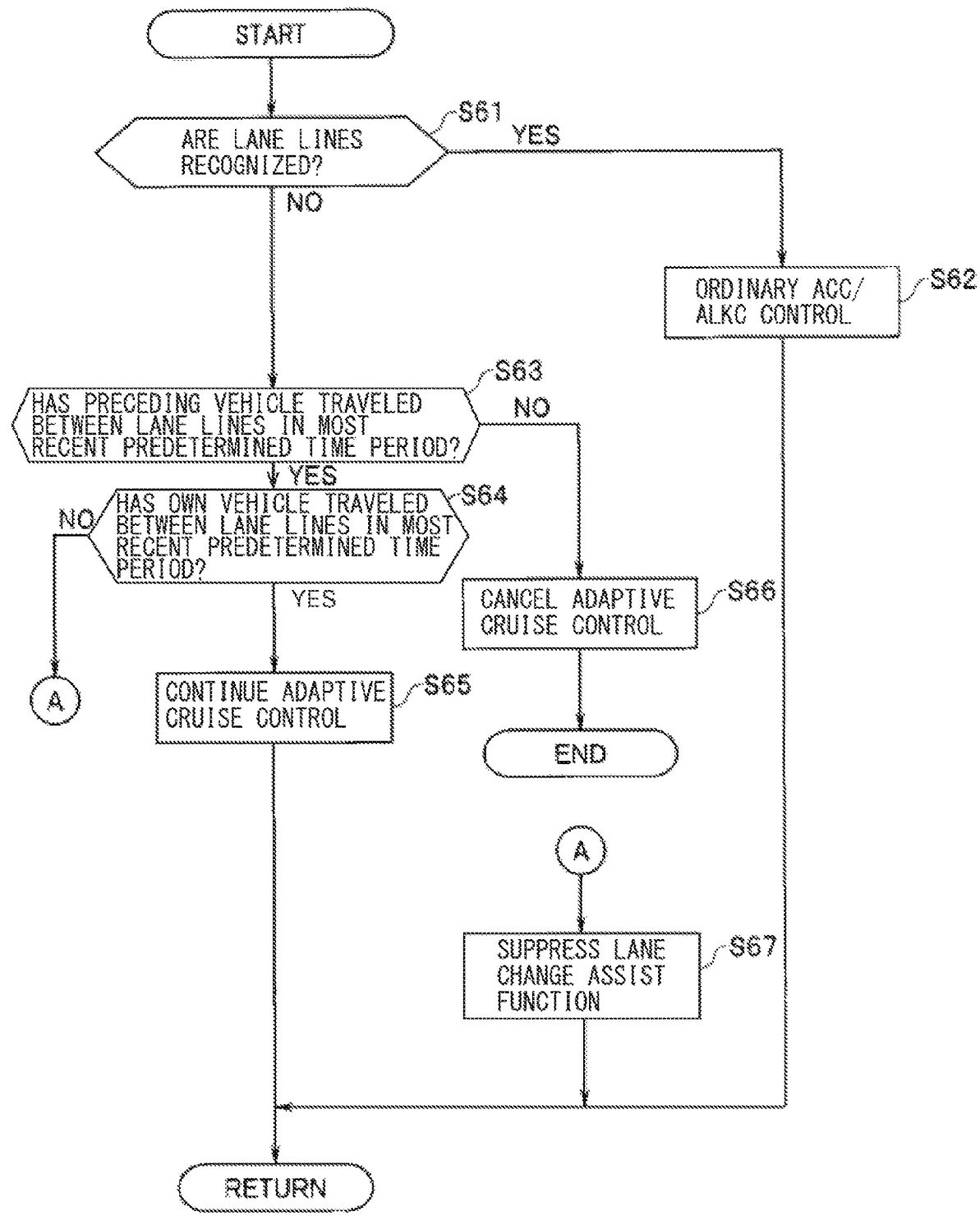
FIG. 25 is a flowchart illustrating a control example of suppressing or cancelling adaptive cruise control in a scene in which the lane lines are unrecognizable while following the preceding vehicle.

For this reason, in the travel control system 1 of the own vehicle M, the travel_ECU 22 may execute a control example illustrated in a flowchart of FIG. 25 when the reliability of the recognition of the lane lines LL and LR is low or the lane lines LL and LR are unrecognizable during the adaptive cruise control.

In one example, as illustrated in FIG. 25, the travel_ECU 22 may determine whether the first traveling environment recognition section 11d recognizes the lane lines LL and LR (S61). At this time, if the first traveling environment recognition section 11d recognizes the lane lines LL and LR (S61: YES), the travel_ECU 22 may execute the ordinary control in which the adaptive cruise control and the lane keeping control are combined (S62), and may cause the process to exit the routine and return to step S61.

If the first traveling environment recognition section 11d does not recognize the lane lines LL and LR (S61: NO), the travel_ECU 22 may determine whether the preceding vehicle P1 has traveled between the lane lines LL and LR in the most recent predetermined time period on the basis of previous traveling-environment image data (S63).

If the preceding vehicle P1 has traveled between the lane lines LL and LR (S63: YES), the travel_ECU 22 may determine whether the own vehicle M has traveled between the lane lines LL and LR in the most recent (last) predetermined time period on the basis of previous traveling-environment image data (S64).

If the own vehicle M has traveled between the lane lines LL and LR (S64: YES), the travel_ECU 22 may continue the adaptive cruise control along the trajectory data of the target points T of the preceding vehicle P1 (S65).

In step S63, if the preceding vehicle P1 has not traveled between the lane lines LL and LR in the most recent predetermined time period (S63: NO), the travel_ECU 22 may cancel (stop) the adaptive cruise control (S66) and may terminate the control routine.

In step S64, if the own vehicle M has not traveled between the lane lines LL and LR in the most recent predetermined time period (S64: NO), the travel_ECU 22 may suppress a lane change assist operation (active lane change assist operation) of the own vehicle M (S67), and may cause the process to exit the routine and return to step S61.

As described above, in the travel control apparatus 10 of the travel control system 1, when the reliability of the recognition of the lane lines LL and LR decreases or the lane lines LL and LR becomes unrecognizable during the adaptive cruise control, the travel_ECU 22 may determine whether the preceding vehicle P1 and the own vehicle M have traveled between the lane lines LL and LR in the most recent predetermined time period, and may continue or cancel (stop) the adaptive cruise control.

Accordingly, in the state where the traveling environment recognition section 11d is unable to recognize the lane lines LL and LR, for example, in the scene in which the preceding vehicle P1 crosses over the wheel trace F on a snow-covered road surface, the travel control apparatus 10 continues the adaptive cruise control if the preceding vehicle P1 and the own vehicle M have traveled between the lane lines LL and LR in the most recent predetermined time period. This makes it possible to reduce the great loss of the steering control of the own vehicle M.

Further, if the own vehicle M has not traveled between the lane lines LL and LR in the most recent predetermined time period, it becomes possible to prevent the own vehicle M from traveling in a wrong lane by suppressing the lane change assist operation.

In the travel control system 1, each of the ECUs 22 to 25, for example, may include a processor including a central processing unit (CPU) and a memory device such as a ROM or a RAM. A configuration of all or a part of a plurality of circuits included in the processor may also be implemented in software. For example, the CPU may read and execute various programs corresponding to respective functions stored in the ROM.

In addition, all or a part of the functions of the processor may be configured by a logic circuit or an analog circuit, and a process of each of the various programs may be implemented by an electronic circuit, such as a field programmable gate array (FPGA).

The technology described above is not limited to the foregoing example embodiments, and various modifications may be made in the implementation stage without departing from the gist of the technology. Further, the foregoing example embodiments each include various stages of the technology, and various technologies may be extracted by appropriately combining the features of the technology disclosed herein.

For example, in a case where the above-described concerns may be addressed and the above-described effects may be obtained even if some features are deleted from all the features disclosed herein, the remaining features may be extracted as a technology.

According to at least one embodiment of the technology, it is possible to suppress great loss of the steering control of the own vehicle while executing the driving assistance.

One or more of the first traveling environment recognition section 11d, the PS_ECU 24, and the E/G_ECU 23 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the first traveling environment recognition section 11d, the PS_ECU 24, and the E/G_ECU 23. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the first traveling environment recognition section 11d, the PS_ECU 24, and the E/G_ECU 23 illustrated in FIG. 1.

The invention claimed is:

1. A vehicle travel control apparatus comprising:
    an outside recognition device including at least one camera and configured to acquire traveling-environment image data that is image data of a traveling environment in front of an own vehicle that is a vehicle controlled by the vehicle travel control apparatus;
    one or more processors; and
    one or more memories storing instructions causing the one or more processors to execute a processing including
        repeating, on a basis of the traveling-environment image data acquired by the outside recognition device, performing detections including a detection of lighting of a brake lamp in another vehicle that is different from the own vehicle, and a detection of blinking of a turn signal lamp in the other vehicle,
        causing a steering mechanism provided in the own vehicle to control the own vehicle to travel along a target traveling course, on a basis of a result of the performed detections, and
        in response to the detection of the blinking of the turn signal lamp in the other vehicle,
            detecting, at a time point, a turning off of the blinking of the turn signal lamp in the other vehicle in which the blinking has been detected, and
            determining whether a predetermined time period has elapsed from the time point,
    wherein the one or more processors are configured to
        start, in response to determining that the predetermined time period has elapsed, an execution of the processing, and
        disable, in response to determining that the predetermined time period has not elapsed, the execution of the processing, and
    wherein, in performing the detection of lighting of the brake lamp in the other vehicle that is different from the own vehicle, and the detection of blinking of the turn signal lamp in the other vehicle, the one or more processors are configured to
        create a bounding box for the other vehicle in the traveling-environment image data, the bounding box including a right end, a left region and a right region closer to the right end than the left region;
        determine whether the brake lamp of the other vehicle is lit based on determining that both of a first light detected in the left region and a second light detected in the right region are blinking; and
        sequentially following the determining whether the brake lamp of the other vehicle is lit, determine whether the turn signal lamp of the other vehicle is blinking based on determining that both of the first light and the second light are not blinking, and that a single one of the first light or the second light is blinking.

2. The vehicle travel control apparatus according to claim 1, the one or more memories storing instructions causing the one or more processors to further:
    operate a brake mechanism of the own vehicle, wherein, when with respect to a parallel-traveling vehicle, blinking of the turn signal lamp on an own vehicle side is detected, operate the brake mechanism and execute deceleration control of the own vehicle, the parallel-traveling vehicle serving as the other vehicle and traveling side by side with the own vehicle, the own vehicle side being a side on which the own vehicle is present.

3. The vehicle travel control apparatus according to claim 1, wherein,
in a case where, during a following control performed with respect to a first preceding vehicle serving as the other vehicle, a parallel-traveling vehicle in which blinking of the turn signal lamp is not detected cuts into a traveling lane of the own vehicle,
the one or more processors control the own vehicle to travel along trajectory data of target points of the first preceding vehicle, the trajectory data being based on a time point at which a target with respect to which the following control is to be performed is switched from the first preceding vehicle to the parallel-traveling vehicle, the parallel-traveling vehicle serving as the other vehicle and traveling side by side with the own vehicle before cutting into the traveling lane and serving as a second preceding vehicle after cutting into the traveling lane.

4. The vehicle travel control apparatus according to claim 3, wherein,
in a case where the second preceding vehicle reaches a limit position of the trajectory data, the one or more processors execute the following control with respect to the second preceding vehicle.

5. The vehicle travel control apparatus according to claim 3, wherein the one or more processors are configured to
determine, in a state where the one or more processors determine that (i) the parallel-traveling vehicle traveling along a left or right lane with respect to a lane in which the own vehicle travels is recognized during the following control, and (ii) a reliability of a recognition of the left or right lane is low or the left or right lane is unrecognizable, whether an overlap rate of the parallel-traveling vehicle with respect to the own vehicle is greater than 0% based on the traveling-environment image data,
cause, in response to determining that the overlap rate of the parallel-traveling vehicle with respect to the own vehicle 0% or less, the own vehicle to travel along a trajectory of target points of the preceding vehicle stored in the own vehicle,
cause, in response to determining that the overlap rate of the parallel-traveling vehicle with respect to the own vehicle becomes 0% or greater, the own vehicle to be decelerated to a predetermined speed until a distance between the own vehicle and the parallel-traveling vehicle becomes a predetermined inter-vehicular distance, and
control, in response to determining whether the overlap rate of the parallel-traveling vehicle with respect to the own vehicle is a predetermined percentage or greater, the own vehicle to travel along trajectory data of target points of the first preceding vehicle, the trajectory data being based on the time point at which the target with respect to which the following control is to be performed is switched from the first preceding vehicle to the parallel-traveling vehicle, the parallel-traveling vehicle serving as the other vehicle and traveling side by side with the own vehicle before cutting into the traveling lane and serving as the second preceding vehicle after cutting into the traveling lane.

6. The vehicle travel control apparatus according to claim 1, wherein,
in a case where the one or more processors determine that (i) the turn signal lamp of the other vehicle is blinking, and (ii) lane lines are no longer recognizable during a following control performed with respect to a preceding vehicle serving as the other vehicle, the one or more processors perform determination of whether each of the preceding vehicle and the own vehicle has traveled between the lane lines in a most recent predetermined time period, and execute, depending on a result of the determination, continuation or stop of the following control with respect to the preceding vehicle.

7. A vehicle travel control apparatus comprising:
an outside recognition device including at least one camera and configured to acquire traveling-environment image data that is image data of a traveling environment in front of an own vehicle that is a vehicle controlled by the vehicle travel control apparatus; and
circuitry configured to execute a processing including
repeating, on a basis of the traveling-environment image data acquired by the outside recognition device, performing detections including a detection of lighting of a brake lamp in another vehicle that is different from the own vehicle, and a detection of blinking of a turn signal lamp in the other vehicle,
causing a driving source of a steering mechanism provided in the own vehicle to control the own vehicle to travel along a target traveling course on a basis of a result of the performed detections, and
in response to the detection of the blinking of the turn signal lamp in the other vehicle,
detecting, at a time point, a turning off of the blinking of the turn signal lamp in the other vehicle in which the blinking has been detected, and
determining whether a predetermined time period has elapsed from the time point,
wherein the circuitry is configured to
start, in response to determining that the predetermined time period has elapsed, an execution of the processing, and
disable, in response to determining that the predetermined time period has not elapsed, the execution of the processing, and
wherein, in performing the detection of lighting of the brake lamp in the other vehicle that is different from the own vehicle, and the detection of blinking of the turn signal lamp in the other vehicle, the circuitry is configured to
create a bounding box for the other vehicle in the traveling-environment image data, the bounding box including a right end, a left region and a right region closer to the right end than the left region;
determine whether the brake lamp of the other vehicle is lit based on determining that both of a first light detected in the left region and a second light detected in the right region are blinking; and
sequentially following the determining whether the brake lamp of the other vehicle is lit, determine whether the turn signal lamp of the other vehicle is blinking based on determining that both of the first light and the second light are not blinking, and that a single one of the first light or the second light is blinking.

8. The vehicle travel control apparatus according to claim 7, wherein,
in a case where the circuitry determines that (i) the turn signal lamp of the other vehicle is blinking, and (ii) lane lines are no longer recognizable during a following control performed with respect to a preceding vehicle serving as the other vehicle, the circuitry performs determination of whether each of the preceding vehicle and the own vehicle has traveled between the lane lines in a most recent predetermined time period, and execute, depending on a result of the determination, continuation or stop of the following control with respect to the preceding vehicle.

9. The vehicle travel control apparatus according to claim 7, wherein, in a case where, during a following control performed with respect to a first preceding vehicle serving as the other vehicle, a parallel-traveling vehicle in which blinking of the turn signal lamp is not detected cuts into a traveling lane of the own vehicle, the circuitry controls the own vehicle to travel along trajectory data of target points of the first preceding vehicle, the trajectory data is based on a time point at which a target with respect to which the following control is to be performed is switched from the first preceding vehicle to the parallel-traveling vehicle, the parallel-traveling vehicle serves as the other vehicle and traveling side by side with the own vehicle before cutting into the traveling lane and serving as a second preceding vehicle after cutting into the traveling lane, the circuitry is configured to:

determine, in a state where the one or more processors determine that (i) the parallel-traveling vehicle traveling along a left or right lane with respect to a lane in which the own vehicle travels is recognized during the following control, and (ii) a reliability of a recognition of the left or right lane is low or the left or right lane is unrecognizable, whether an overlap rate of the parallel-traveling vehicle with respect to the own vehicle is greater than 0% based on the traveling-environment image data;

cause, in response to determining that the overlap rate of the parallel-traveling vehicle with respect to the own vehicle 0% or less, the own vehicle to travel along a trajectory of target points of the preceding vehicle stored in the own vehicle;

cause, in response to determining that the overlap rate of the parallel-traveling vehicle with respect to the own vehicle becomes 0% or greater, the own vehicle to be decelerated to a predetermined speed until a distance between the own vehicle and the parallel-traveling vehicle becomes a predetermined inter-vehicular distance; and control, in response to determining whether the overlap rate of the parallel- traveling vehicle with respect to the own vehicle is a predetermined percentage or greater, the own vehicle to travel along trajectory data of target points of the first preceding vehicle, the trajectory data being based on the time point at which the target with respect to which the following control is to be performed is switched from the first preceding vehicle to the parallel-traveling vehicle, the parallel-traveling vehicle serving as the other vehicle and traveling side by side with the own vehicle before cutting into the traveling lane and serving as the second preceding vehicle after cutting into the traveling lane.

* * * * *